F. R. STEHM.
BRICKMAKING MACHINE.
APPLICATION FILED JUNE 15, 1914.

1,280,575.

Patented Oct. 1, 1918.
18 SHEETS—SHEET 2.

Witnesses:
John Enders
Sebastian Huston

Inventor:
Frank R. Stehm
by Wallace R Lane
Atty.

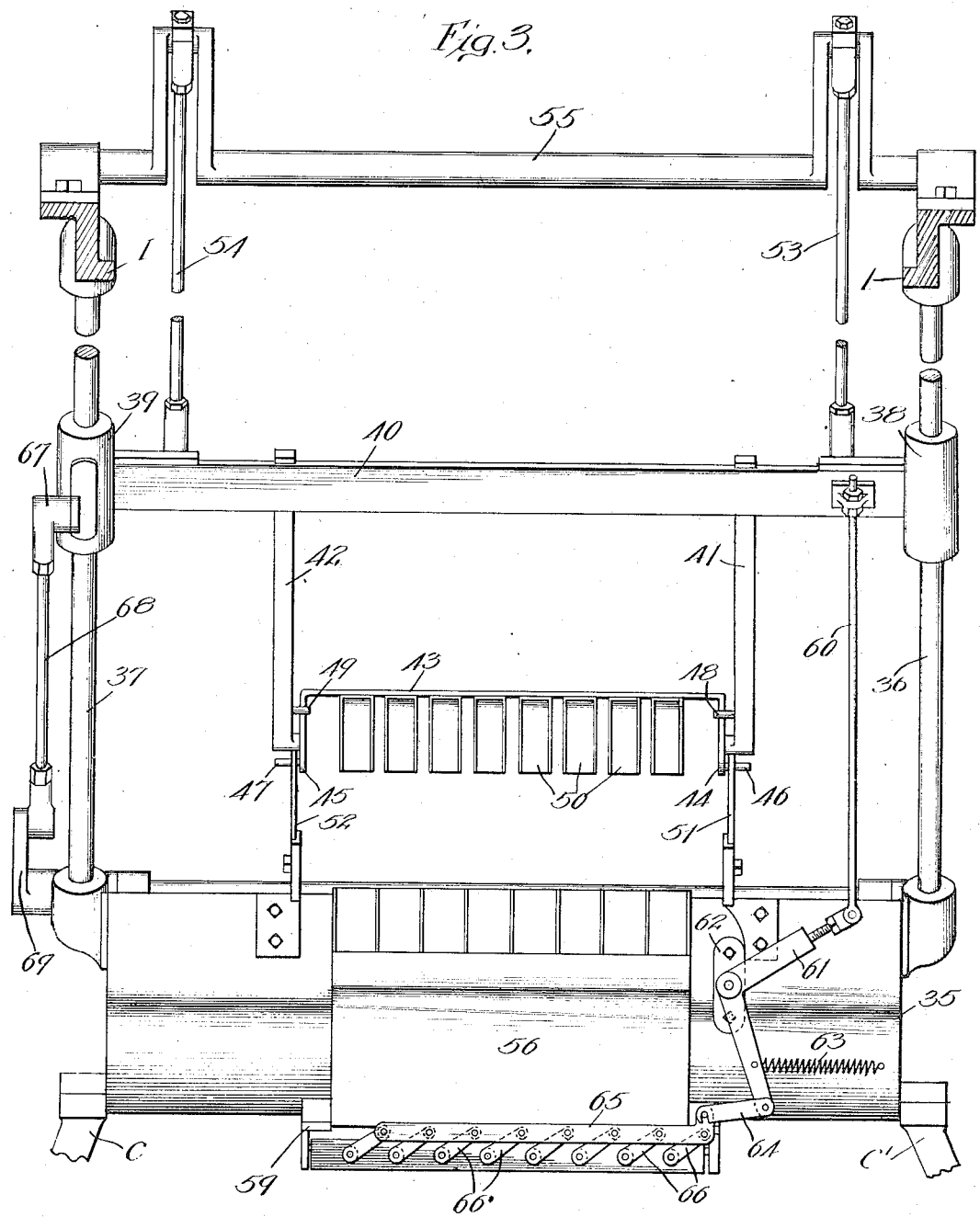

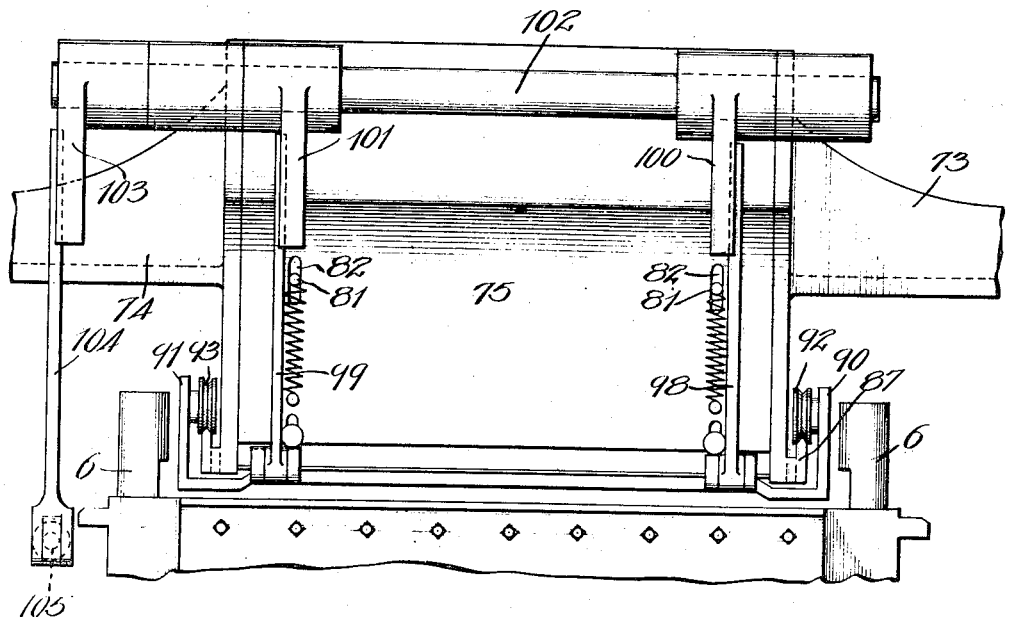

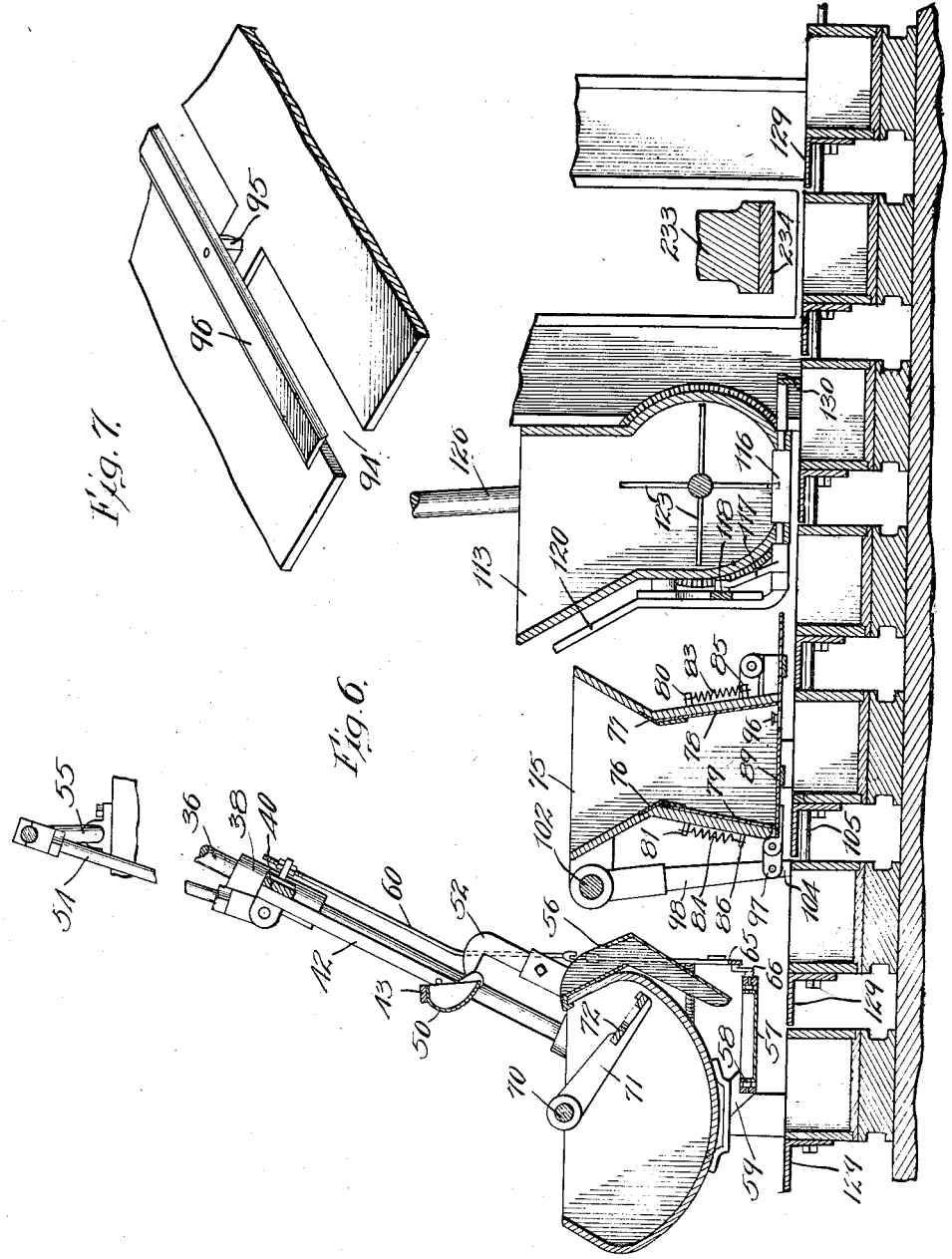

F. R. STEHM.
BRICKMAKING MACHINE.
APPLICATION FILED JUNE 15, 1914.
1,280,575.
Patented Oct. 1, 1918.
18 SHEETS—SHEET 6.
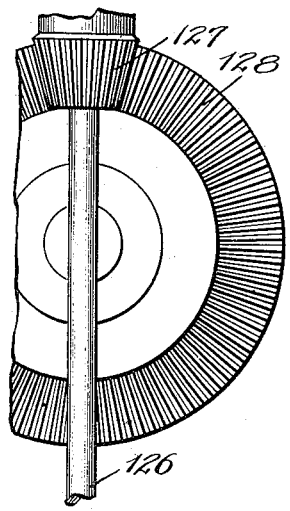
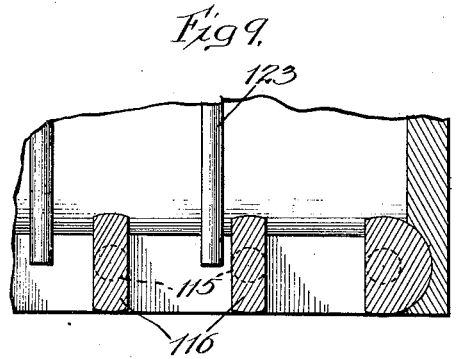
Fig. 9.
Fig. 8.
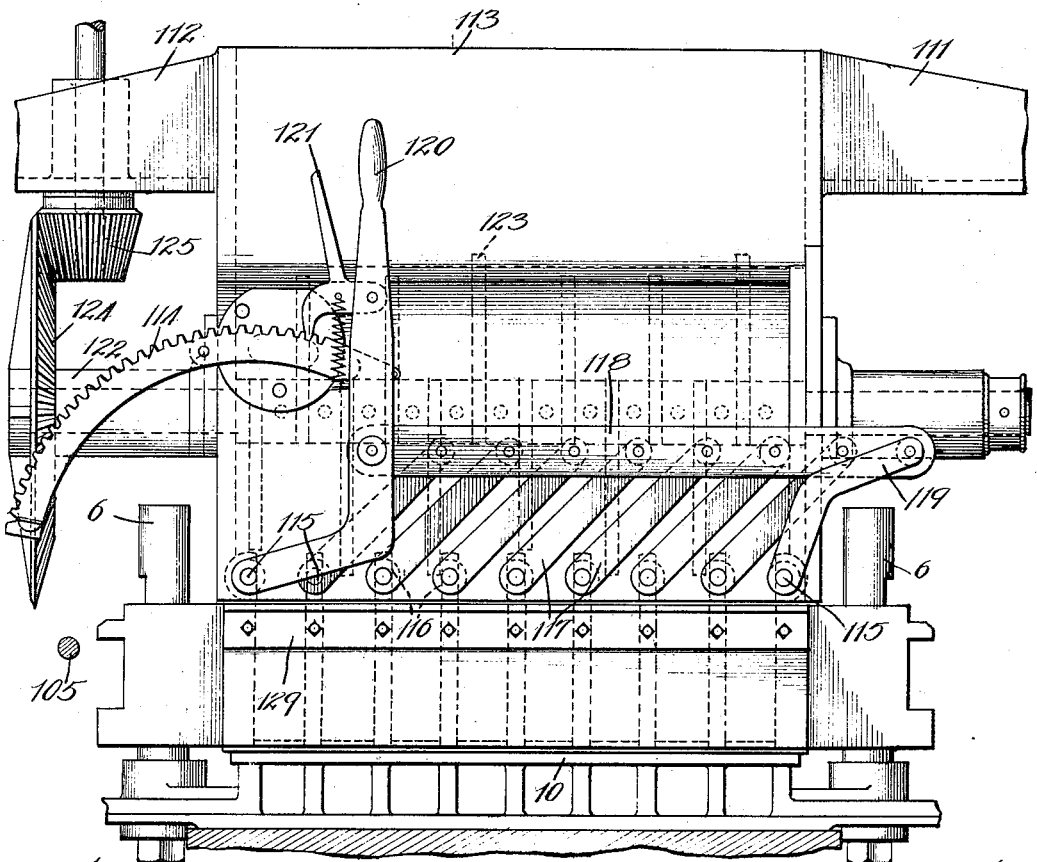
Witnesses:
M. E. Martin
Sebastian Hinton
Inventor:
Frank R. Stehm
By Wallace R. Lane
Atty.

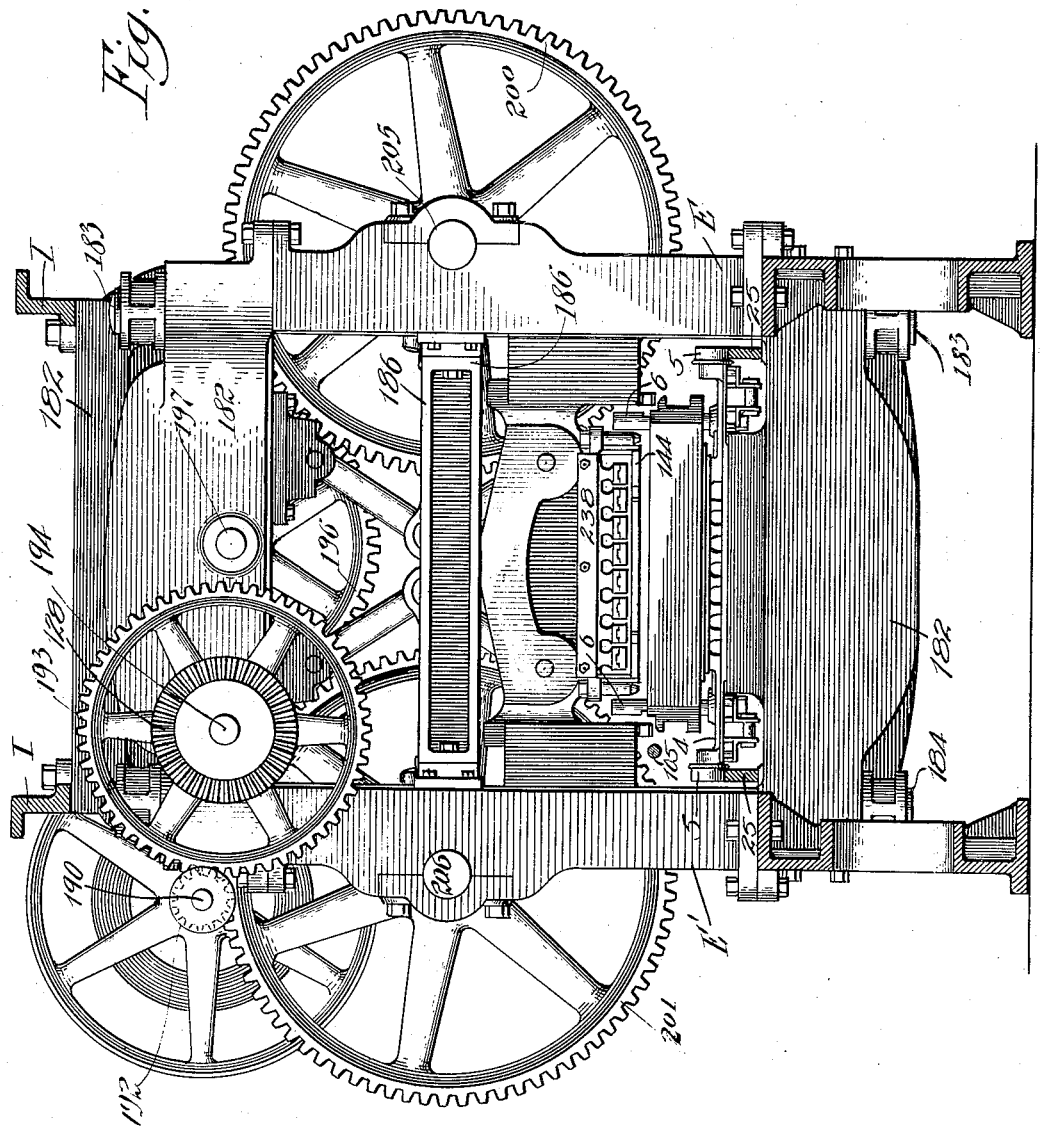

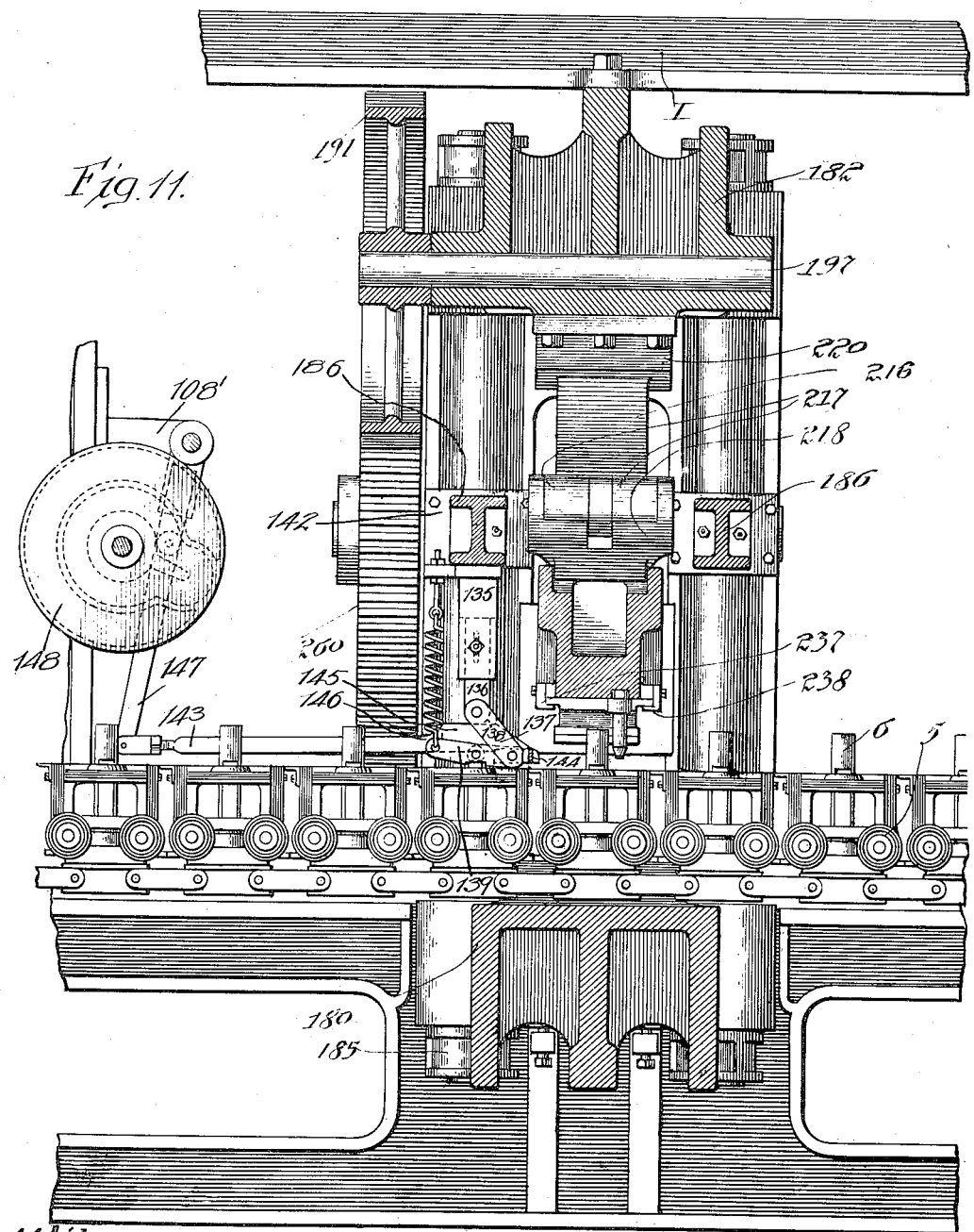

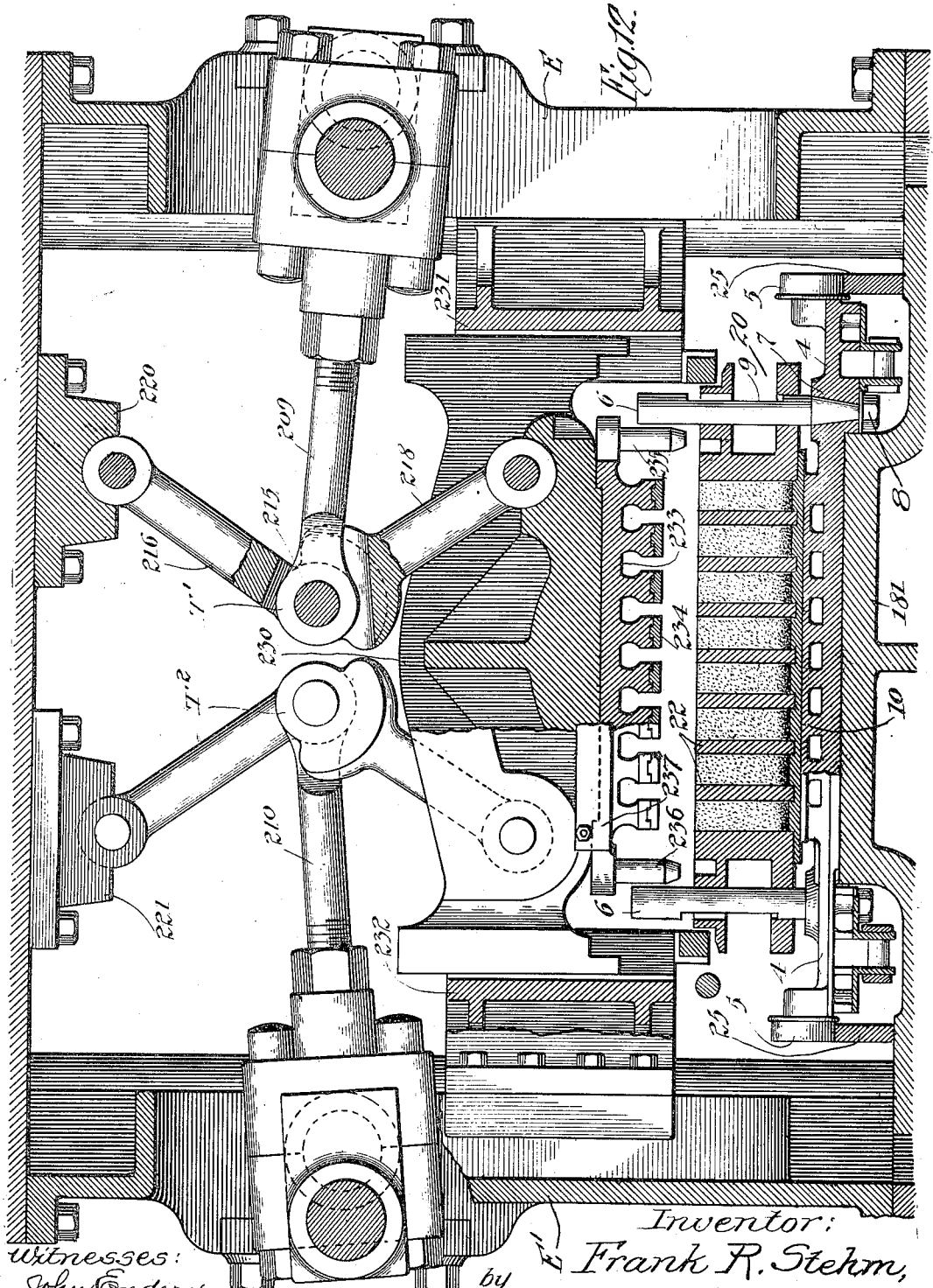

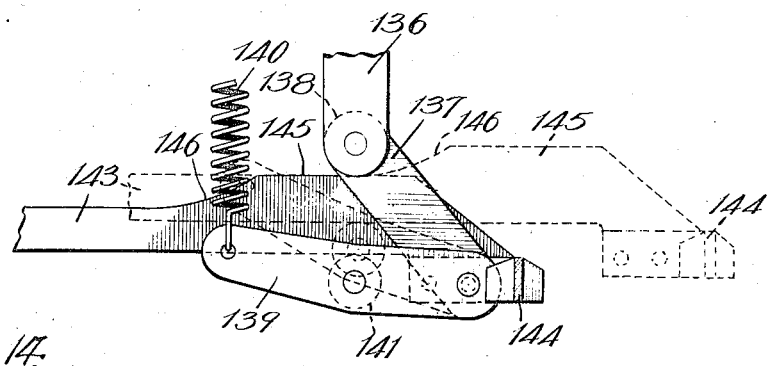
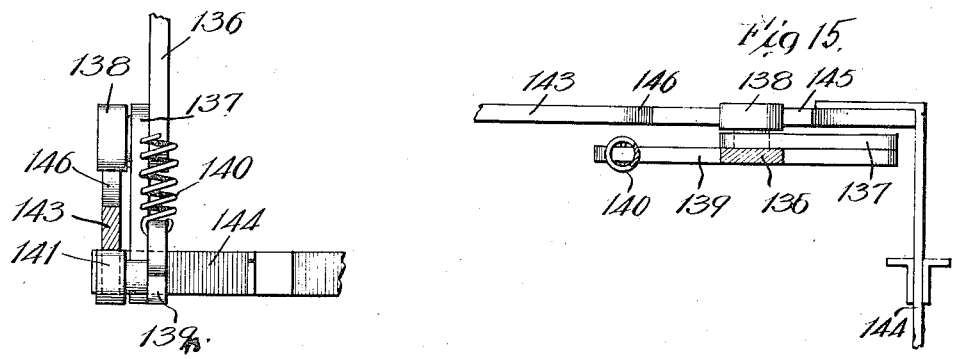
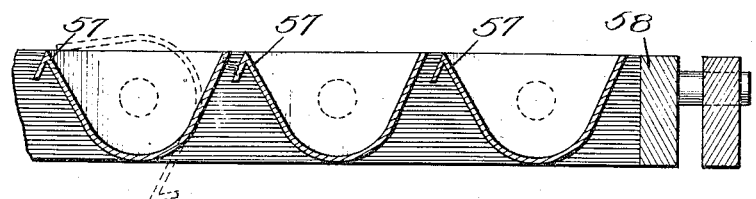
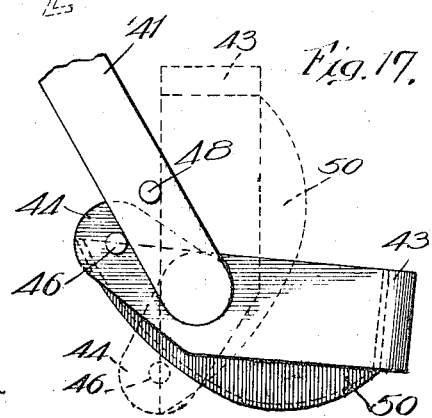

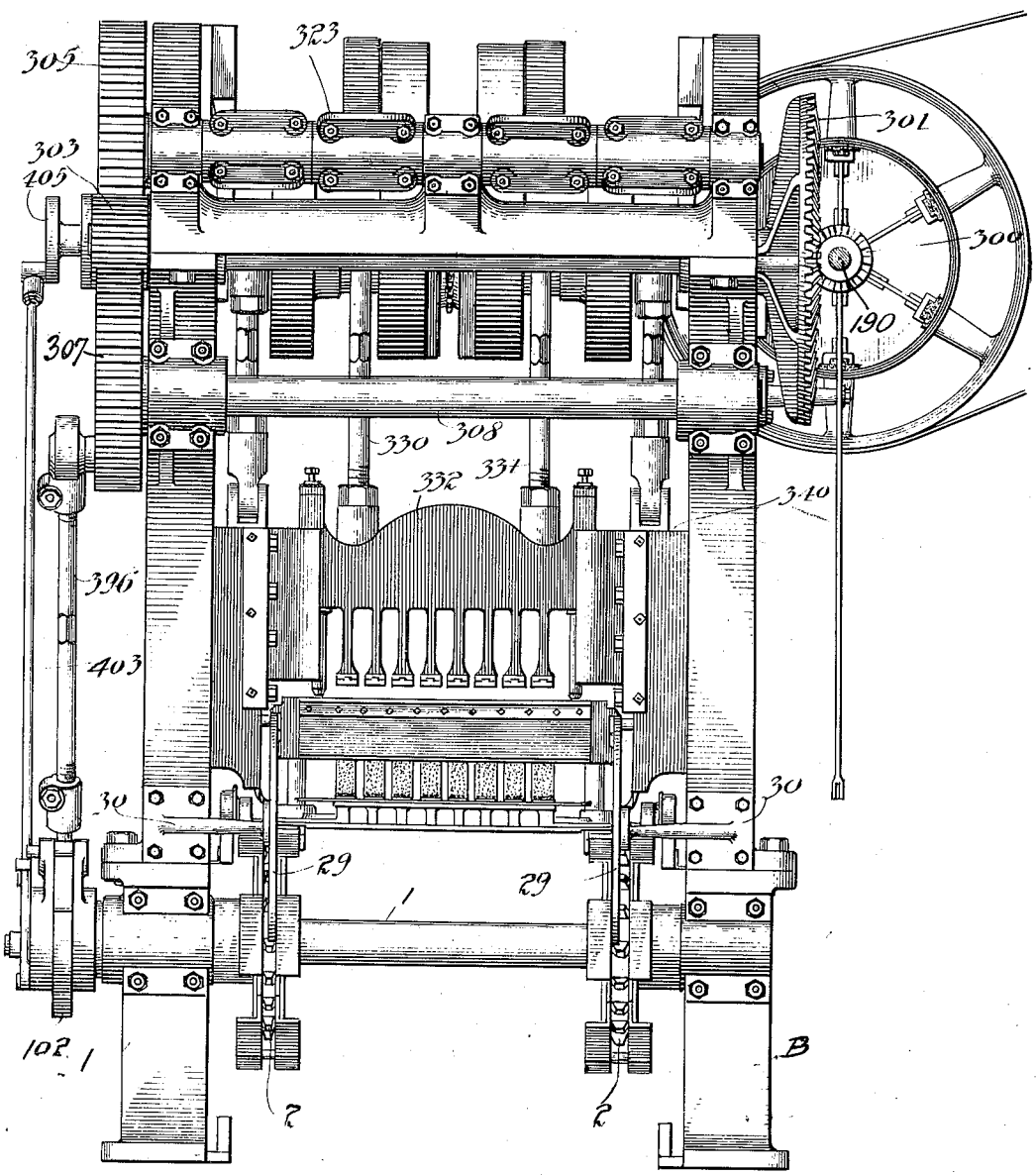

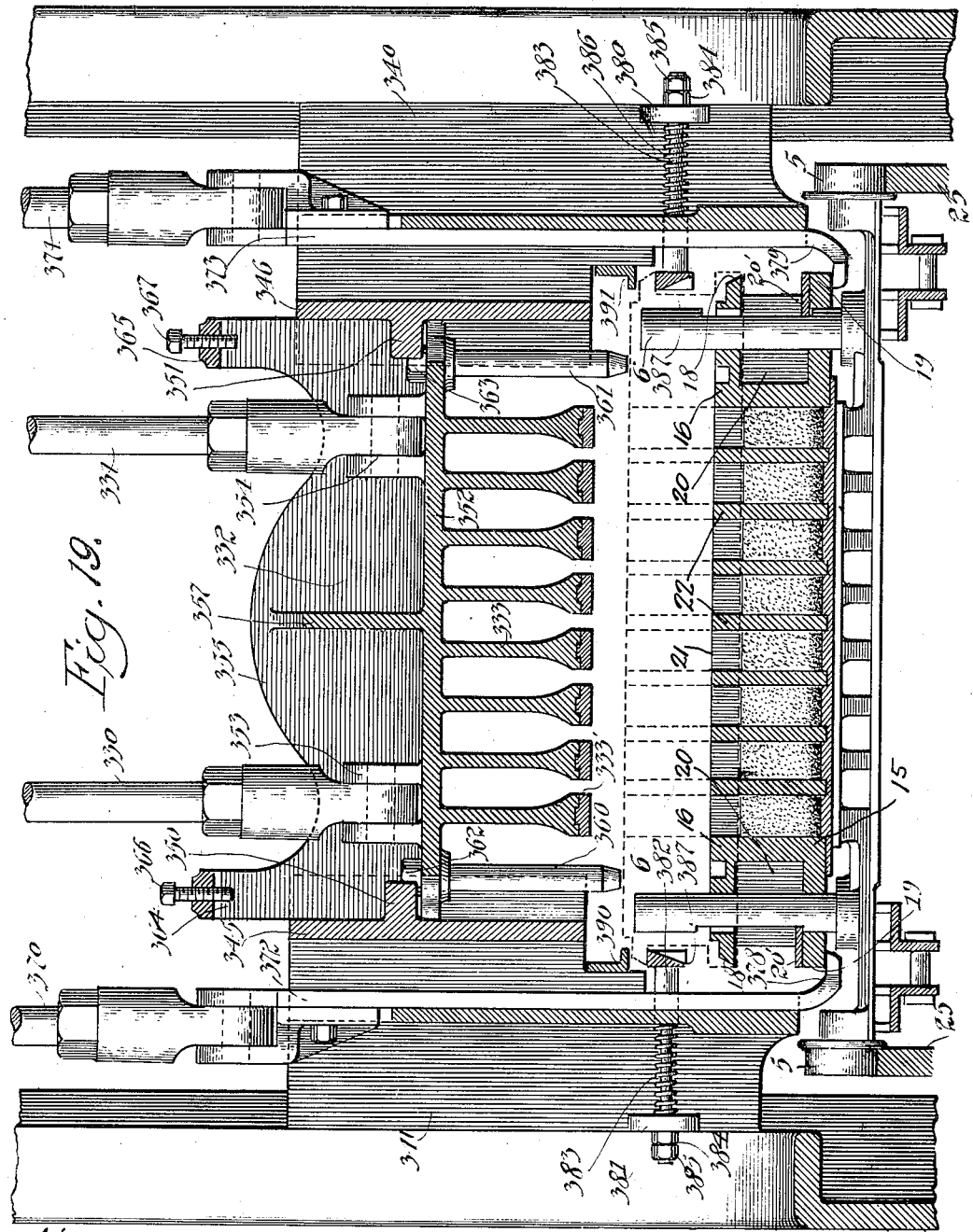

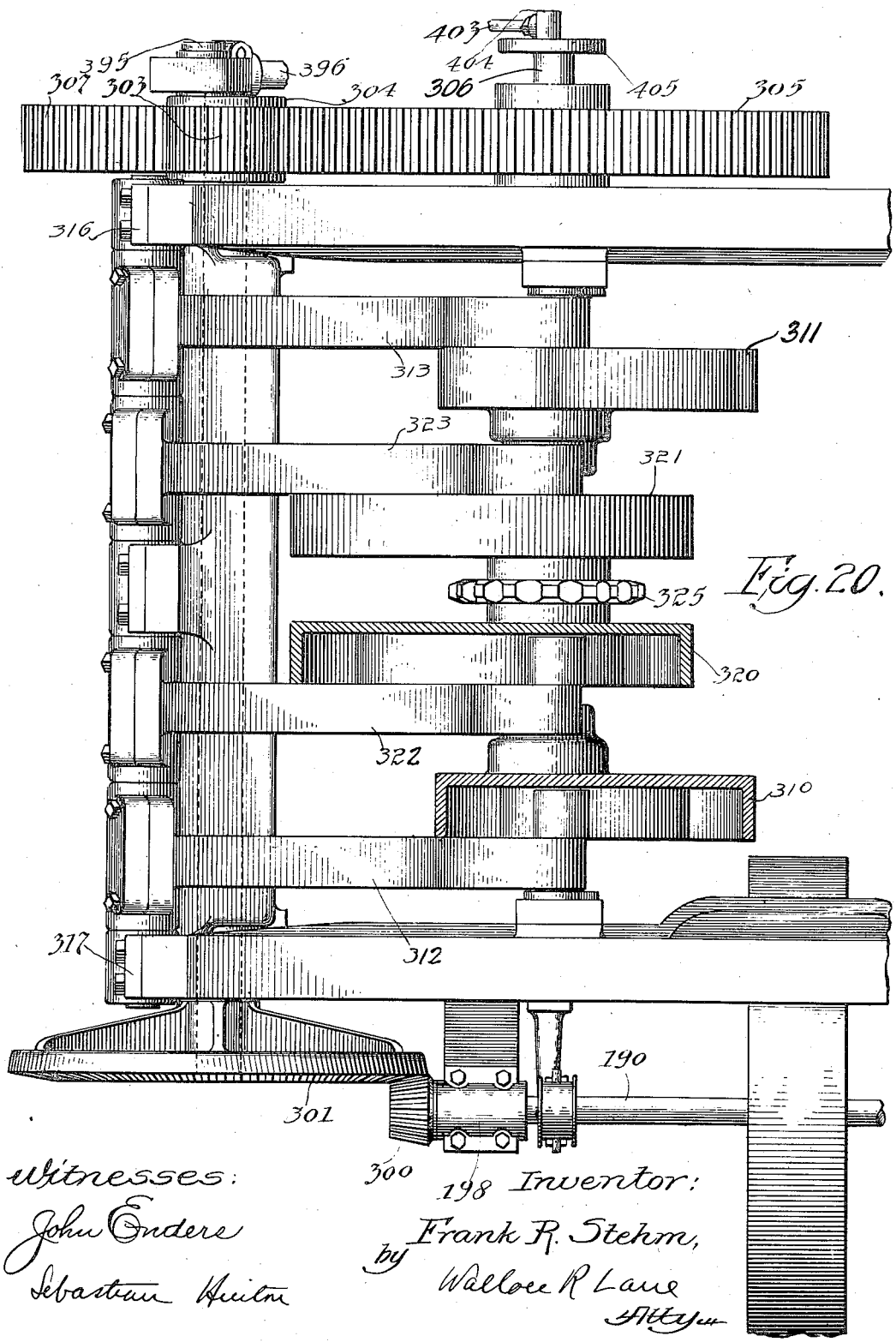

F. R. STEHM.
BRICKMAKING MACHINE.
APPLICATION FILED JUNE 15, 1914.
1,280,575.
Patented Oct. 1, 1918.
18 SHEETS—SHEET 14.
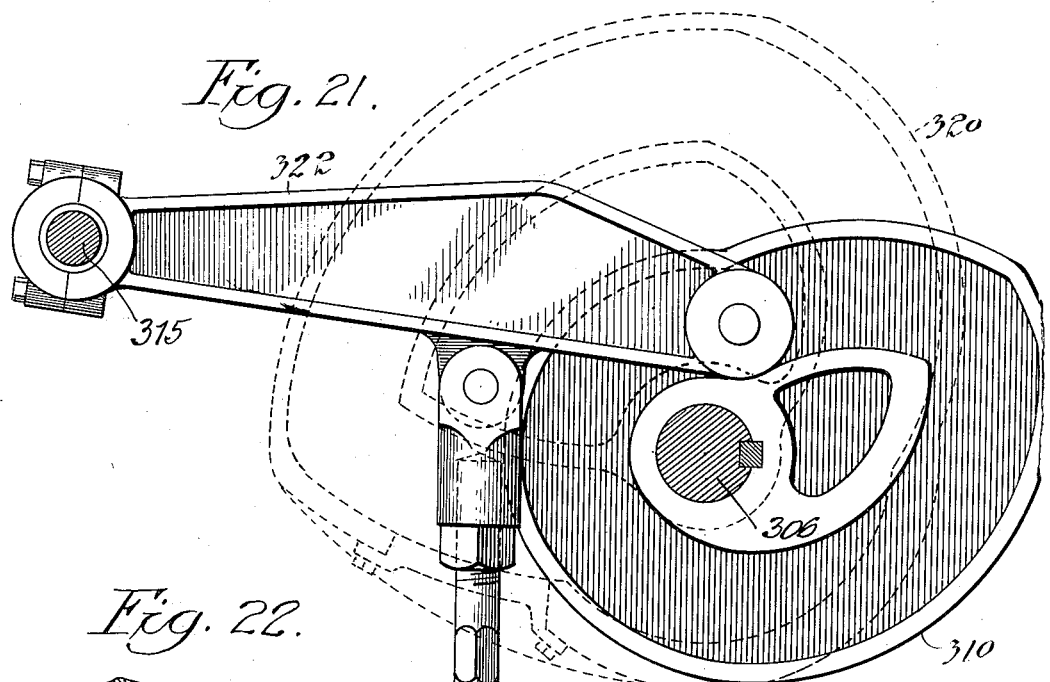
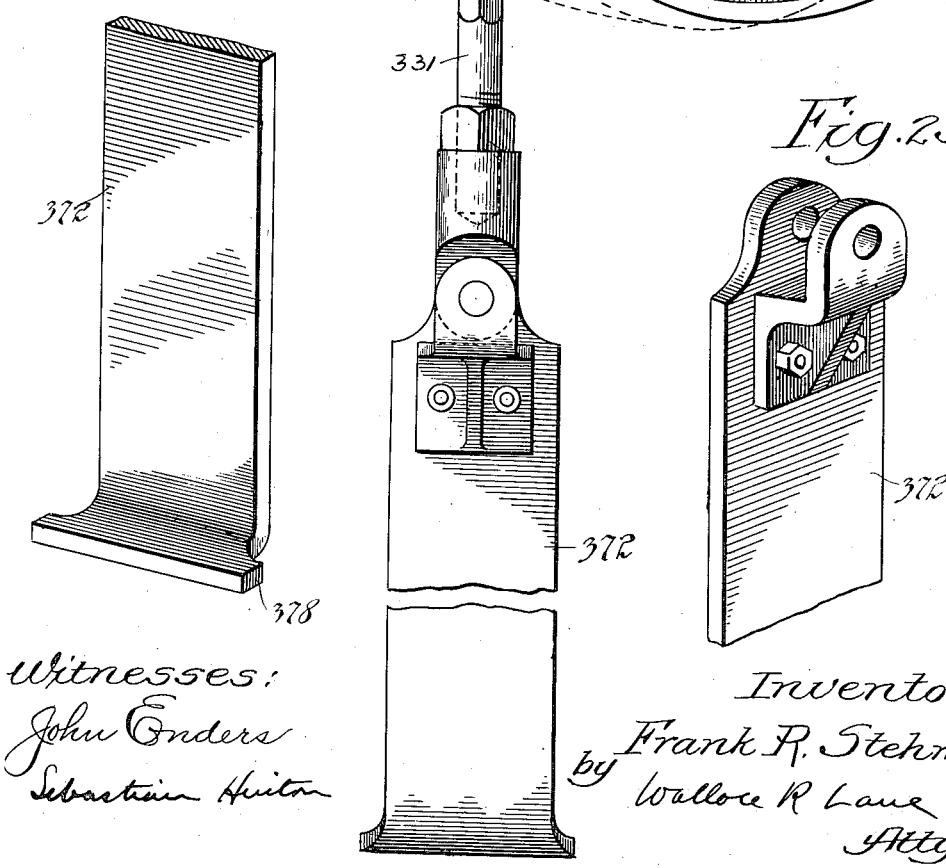
Witnesses:
John Enders
Sebastian Hinton
Inventor:
Frank R. Stehm,
by Wallace R Lane
Atty.

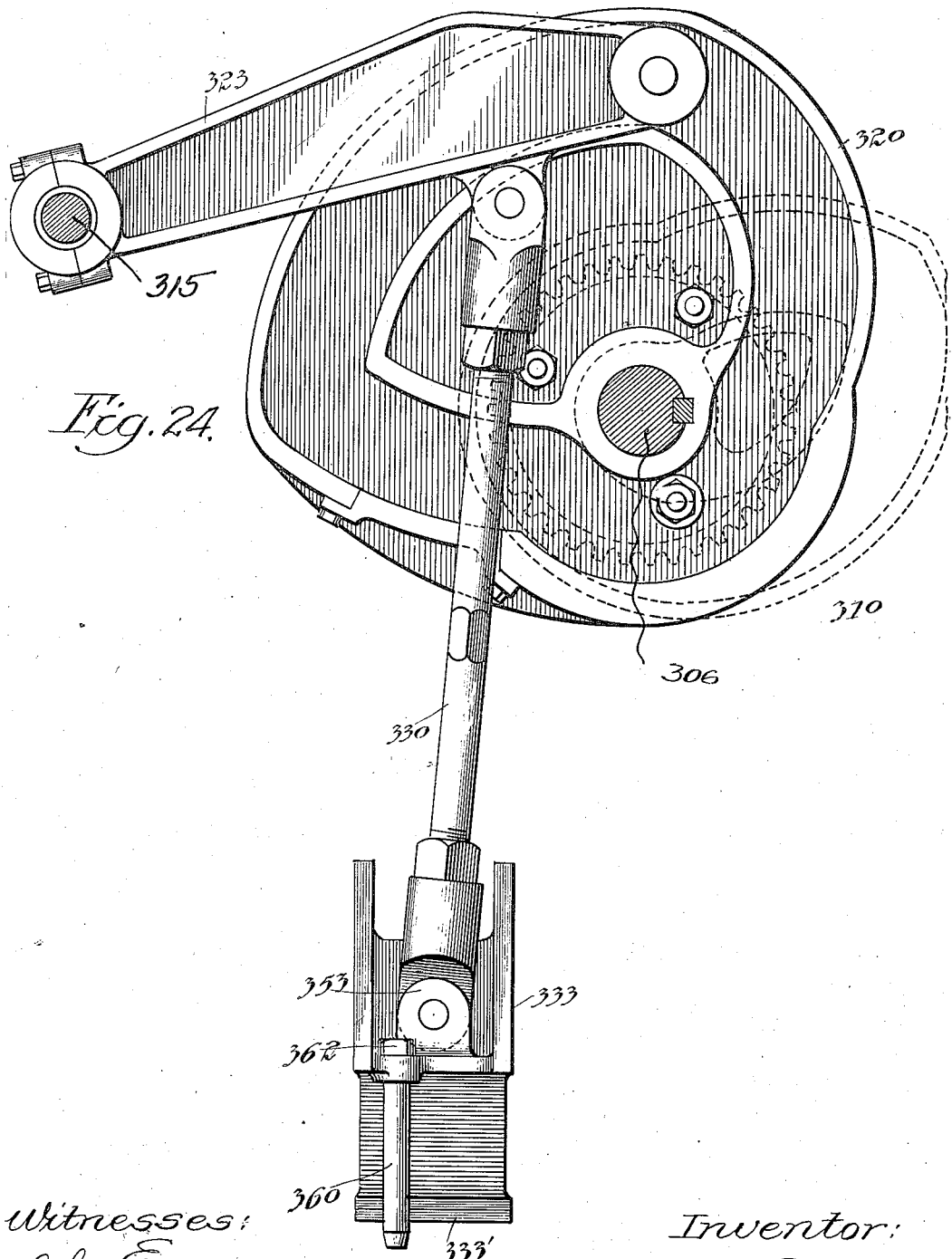

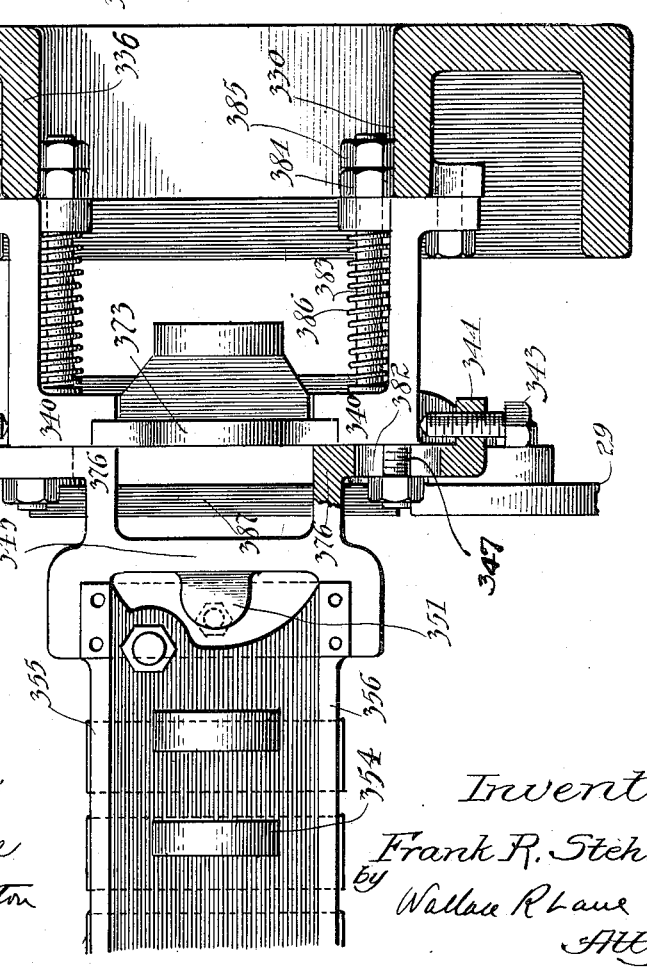

F. R. STEHM.
BRICKMAKING MACHINE.
APPLICATION FILED JUNE 15, 1914.
1,280,575.
Patented Oct. 1, 1918.
18 SHEETS—SHEET 17.
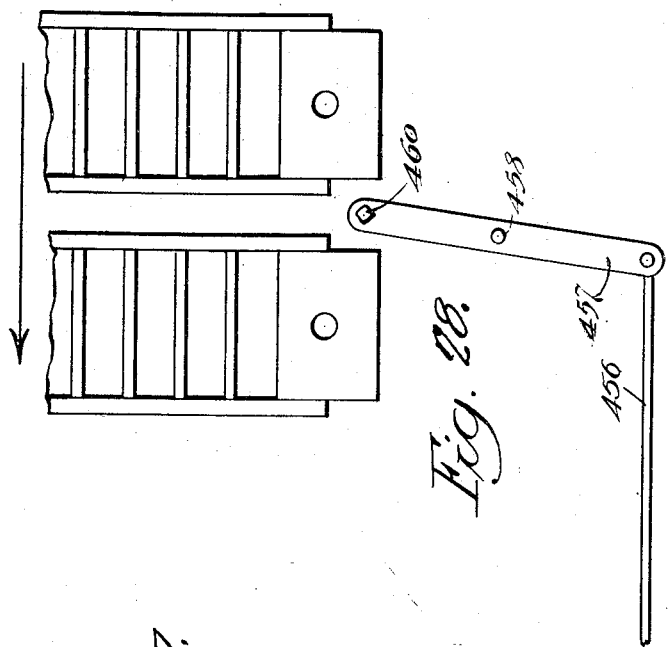
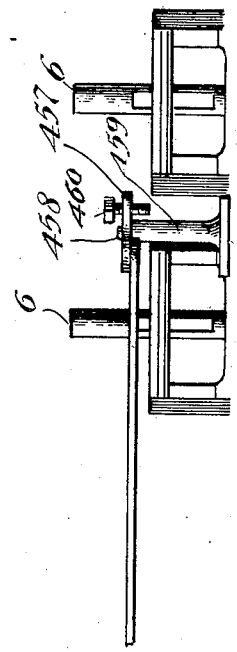
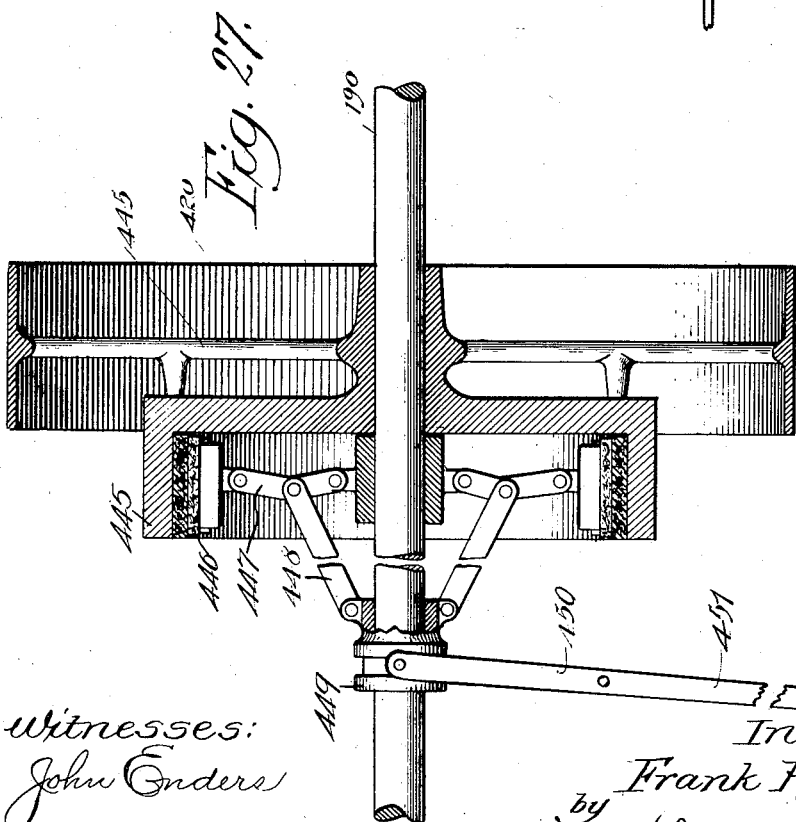
Witnesses:
John Enders
Sebastian Hinton
Inventor:
Frank R. Stehm,
by Wallace R Lane
Atty.

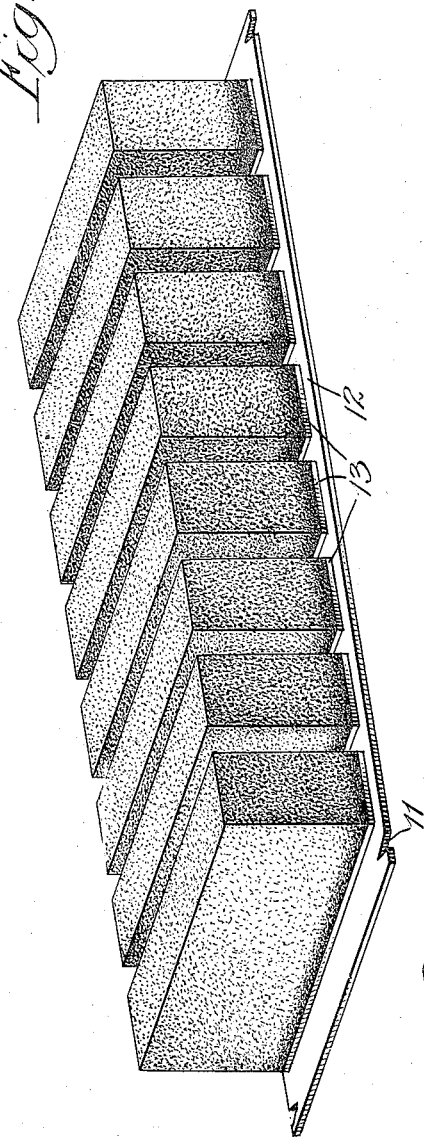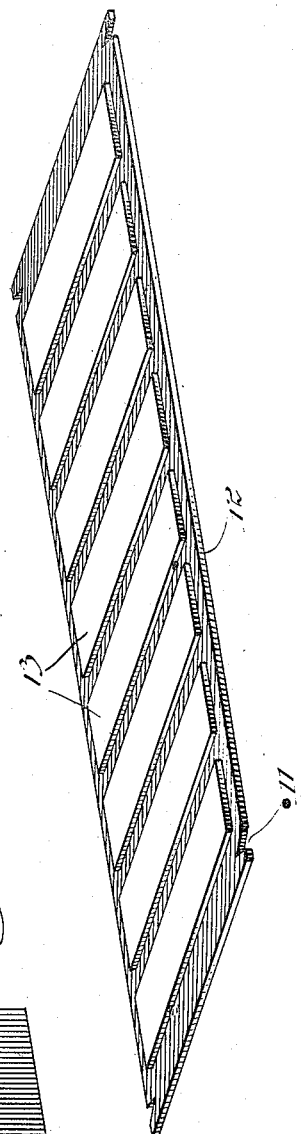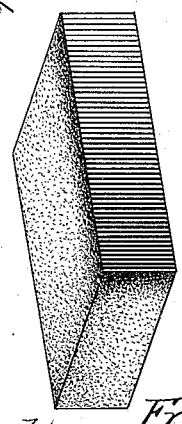

UNITED STATES PATENT OFFICE.

FRANK R. STEHM, OF DES MOINES, IOWA, ASSIGNOR TO THE ENAMEL CONCRETE COMPANY, OF DES MOINES, IOWA, A CORPORATION OF SOUTH DAKOTA.

BRICKMAKING-MACHINE.

1,280,575.  Specification of Letters Patent.  Patented Oct. 1, 1918.

Application filed June 15, 1914.  Serial No. 845,109.

*To all whom it may concern:*

Be it known that I, FRANK R. STEHM, a citizen of the United States, residing at Des Moines, in the county of Polk and State of Iowa, have invented new and useful Improvements in Brickmaking - Machines, of which the following is a specification.

This invention relates to an automatic brick making machine and more specifically to a machine for making concrete brick.

It is an object of my invention to manufacture compressed concrete brick or other similar products having at least one face of a predetermined texture and color. In the embodiment of my invention herein disclosed, the "finished" face is smooth, non-adhesive and water-proof, whereby the finished brick is non-absorbent on its exposed side, aseptic and may be washed whenever desired or, if exposed, is washed down from time to time by the rain.

Another object of my invention is to provide a means whereby mold parts may be automatically assembled upon a pallet which forms the bottoms of the molds and has a finished surface of the desired texture and again automatically disassembled therefrom at the delivery end of the machine in order to allow the removal of the pallet with the finished brick upon it, without disturbing the contact between the two.

A further object of my invention is to discharge into the molds when so assembled, a liquid or semi-liquid layer preferably consisting of powdered cement mixed with fine sand, with water enough added to make a readily flowing mixture which will spread out, intimately associate itself with the polished non-adhesive surface of the pallets forming the bottoms of the molds and thus assume the surface of the latter when dry. The liquid layer may be colored if desired or may be the natural color of the finely ground material of which it is composed. I term the liquid layer an "enameling layer" or an "enameled layer" because it imparts to the brick a surface having all the advantages of an enamel coating.

It is another object of my invention to superimpose upon and unite with this liquid or semi-liquid layer, the layer or layers of concrete comprising the remainder of the brick.

It is another object of my invention to interpose in the manufacture of the brick, between the liquid surfacing layer and the body of the brick, what I have termed a "cushioning" layer, or a layer preferably formed of the same material as the liquid layer but in dry or in plastic form. This cushioning layer performs several important and new functions. Its most important function is to shield the liquid layer from the impact of the brick making material when the latter is dropped into the mold and thus to prevent the splashing of the liquid layer or its being sloshed so as to be thinner in the finished brick in some places than in others. Next the cushioning layer which preferably consists of material the same as that of the liquid layer but drier becomes intimately mixed with the latter, absorbs its excess moisture while still not disturbing the intimate contact between the bottom of the liquid layer and the face of the pallet due to the fluidity of the liquid. Its third function is to form a supplementary backing for the liquid layer, thus making up the required thickness of surfacing material.

It is another object of my invention to remove the wet formed brick and the polished non-adhesive surface on which it was formed, together, without breaking the contact between the two and thus to permit the brick to be dried in contact with and resting upon the said polished non-adhesive surface whereby the said surface will be at the bottom of the brick while the latter is drying. The face of the brick adjacent the polished surface will therefore dry slowly. Owing to the fact that this face is at the bottom of the mass of the brick, the gradual settling of excess liquid in the brick will make an excess of liquid at the finished face, which in combination with the leisurely drying will result in perfect crystallization of all of the concrete adjacent the surface of the pallet and the finished surface of the brick will assume a hard glossy and polished texture with exact fidelity to that of the surface upon which it was formed and dried.

From the foregoing it will be seen that my invention contemplates three individual feeds; first the liquid feed of finely divided material, second the cushion feed, preferably of the same material, but dryer, third the feed of the material forming the body of the brick. The charges thus introduced into the molds are thereafter strongly compressed, the sides of the mold sections raised while the brick is held upon the pallet and finally the pallet and the brick thereon are removed without disturbing the contact between the two, and set aside to dry. When dry the brick will be found to have an enamel layer on one face, whose texture is the same as that of the pallet.

Other objects and advantages of the invention will appear as the description to follow proceeds.

In the drawings:

Fig. 3 is a rear elevation on a section transverse to the machine of the liquid feed and its associated mechanism.

Fig. 4 is a detail view of the cushion feed.

Fig. 5 is a partial sectional view of the same.

Fig. 6 is a sectional view taken longitudinally of the machine of the first three mechanisms involved therein.

Fig. 7 is an enlarged perspective view of the shaving knife and slot in the cushion feed.

Fig. 8 is a view of the material hopper and its operating mechanism.

Fig. 9 is an enlarged sectional view of a portion thereof.

Fig. 10 is a front elevation of the compression plunger mechanism.

Fig. 11 is an end view of the same partly in section.

Fig. 12 is a detail cross sectional view of the compression plungers and their operating mechanisms on a larger scale.

Fig. 13 is a detail view of a portion of the mechanism for cleaning the compression plungers.

Figs. 14 and 15 are detail views of portions of the same mechanism.

Fig. 16 is a cross sectional view upon a large scale of the buckets for the liquid feed.

Fig. 17 is an elevation upon an enlarged scale of the dippers.

Fig. 18 is a rear elevation of the machine.

Fig. 19 is a cross sectional view showing the releasing plungers.

Fig. 20 is a top plan view showing the operating cams for releasing plungers and lifter mechanisms.

Fig. 21 is an elevation of the lifter mechanism.

Figs. 22 and 23 are detail perspective views of portions of the same.

Fig. 24 is an elevation of the releasing plunger mechanism.

Figs. 25 and 26 are two plan views upon different sections of the same.

Fig. 27 is a view partly in section of the clutch mechanism for driving the machine.

Fig. 28 is a plan view of a portion of the stop mechanism.

Fig. 29 is a perspective view of the pallet with the finished brick thereon.

Fig. 30 is a perspective view of the pallet, and

Fig. 31 is a perspective view of a finished brick.

*The frame.*

Figure 1:
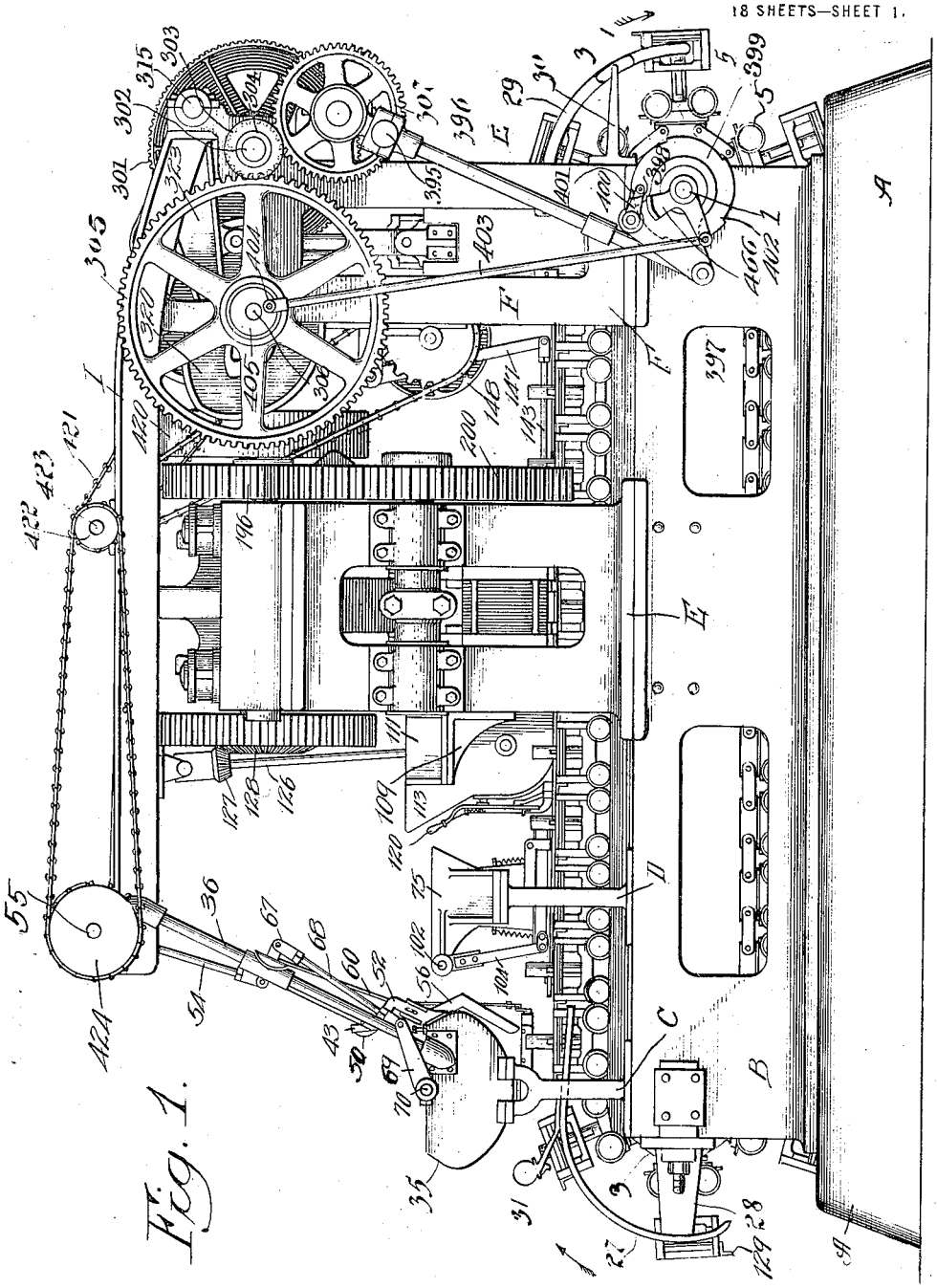
Figure 1 is an elevation of the right hand side of the machine.

In the drawings the frame of the machine comprises the main castings A upon which are the two main castings B and B'. Upon the castings B are bolted the standards C, D, E and F and upon the frame casting B', are bolted the corresponding uprights C', D', E' and F', these upright members supporting therebetween operating mechanisms of the machine. Secured to the uprights E, E' and F, F' is a super-structure I projecting forward from the standards E, E' and in which are mounted other operating mechanisms of the machine, to be hereinafter described.

*The conveyer mechanisms.*

At the rear end of the machine and having bearings in the frame pieces B and B' is the shaft 1. A corresponding shaft (not shown) is at the other end of the machine. Upon the shaft 1 are a pair of sprockets 2 and upon the corresponding shaft at the other end of the machine are corresponding sprockets. Over these sprockets run chains 3 which carry as alternate links thereof the pallet bed plates 4. These pallet bed plates are each provided upon either side with wheels 5 see Fig. 12 and carry therein adjacent either end, the upright pins 6, tapered at their lower ends and engaged in the tapered recess 7 in the pallet bed plates and fastened therein by nuts 8 engaging with the threaded end portions. By this construction the pins are firmly held in upright position. Each pin has a cut away portion 9 thereupon for a purpose hereinafter to be described. Intermediate the pins is the pallet supporting portion of the pallet bed plate 4 comprising a smooth flat platform 10 having thereupon suitable upright projections (not shown) to engage in V-shaped notches 11 in the pallets 12, (see Fig. 30). The pallets 12 are provided with raised portions 13 each surfaced to correspond with the surface it is desired to give the finished brick, and corresponding exactly in size with one face of the brick. Mounted upon the pins 6 are mold sections 15 see Fig. 19 comprising end portions 16 having projecting therefrom the lugs 18 and 19 with recesses 20 therebetween, and the sides 21 into which are set the partitions 22 dividing each mold section into a plurality of molding chambers each adapted to accommodate a single brick. Upon the lower lug 19 of the molds is a plate 20' whose inner edge abuts the face of the cut away portion 9 of the pins 6. The sliding movement of the mold sections 15 upon these pins is thereby limited, the outer limit of the sliding movement of the mold being that in which the plates 20' abut the metal forming the upper end of the recesses 9 of the pins 6. This keeps the mold from dropping off the pins as they ride around on the conveyer under the machine in an inverted position. Mounted upon the framework of the machine adjacent the sides thereof are a pair of track-ways 25 which run substantially the entire length of the machine and upon which the pallet bed plates are supported through the intermediary of the rolls 5 hereinbefore described.

At the front end of the machine are a pair of curved guide plates 27 one of which is supported by the webs 28 bolted to the frame of the machine. These guides enter the recesses 20 in the ends of the molds as the molds come up over the conveyer shaft at the front end of the machine, and positively hold the molds in extended position upon the pins 6 until they have advanced to a definite position, after which by the positive action of the guides 27 and their own weight, the molds are eased down until they rest squarely upon the pallets 13 which have meanwhile been manually introduced upon the pallet bed plate 10 during the time the molds were held away from the pallet bed plate as they travel around the front of the machine.

Adjacent the rear end of the machine are a similar pair of trackways 29 supported at their rear ends by braces 30 (Figs. 1 and 18). These guides 29 positively hold the mold up away from the pallet bed plates as the corresponding conveyer section emerges from the machine in order to permit the pallet bed plate, together with the brick thereupon to be removed. Mechanisms for positively raising the mold 15 and placing it in a position to engage the trackways 29 will be hereinafter described. The conveyer, as a whole, is driven by the pawl and ratchet mechanisms shown at the extreme right of Fig. 1 and therefore moves intermittently, pausing in its travel to allow various operations to be performed upon the various mold sections during their stay in the machine. It will be apparent that the platen 12 fits snugly into the molds 15 in such a fashion that the raised portions 13 of the pallet form tight bottoms for the molding sections.

The oil supply 31 is provided to render easy the operation of the various guides in connection with the recessed ends of the molds.

*The surfacing tank.*

(Figs. 1, 2, 3, 6 and 19.)

Mounted upon the forward standard C, C' is a surfacing tank 35 to which are rigidly connected the slide rods 36 and 37 the upper end of these rods being rigidly secured to the super-structure I as clearly shown in Fig. 3. Slidable upon the rods 36 and 37 is a frame comprising the collars 38 and 39 to which is rigidly secured the cross bar 40. Depending from the cross bar 40 and rigidly connected therewith are the rods 41 and 42 to which is pivoted the U-shaped frame 43 having upwardly inclined forward ends 44 and 45. In the forward ends of this U-shaped frame are mounted outwardly projecting pins 46 and 47. In the rods 41 and 42 respectively are mounted the inwardly projecting pins 48 and 49. Attached to the U-shaped frame 43 are a series of buckets or dippers 50. The construction is such that the dippers normally hang in the position illustrated in Fig. 17 wherein the pins 46 and 47 rest against the rods 41 and 42. In this position the bucket will retain the charge of liquid. Mounted upon the rear side of the tank 35 and adjustable by means of a slot and bolt connection, in an obvious manner, are hooks 51 and 52. The cross piece 40 is reciprocated by pitmen 53 and 54 from the crank shaft 55 operated by driving connections hereafter to be described.

It is obvious that if the cross piece 40 is reciprocated the dippers 50 will be dipped into the tank 35, then raised up over the edge of the tank into the position shown in Fig. 6 being tilted by the engagement of the hooks 51 and 52 with the pins 46 and 47 to empty their contents over the side of the tank.

Mounted upon the rear side of the tank 35 is the duct 56 divided into compartments, one for each dipper 50 and having a forwardly projecting lower end, (see Fig. 6) which serves to conduct the contents of each dipper into one of a series of troughs 57 pivotally mounted in the rectangular frame 58 secured to the bottom of the tank 35 by a bracket 59. The troughs 57 run longitudinally of the machine and are each located in a position directly above a mold section at the time the molds come to rest to receive their first charge. Depending from the cross piece 40 is a rod 60 having an adjustable connection with the bell crank 61 pivotally mounted on bracket 62 upon the rear of the tank 35. This bell crank is normally held in its retracted position by the spring 63 and has a hook connection 64 with a plate 65 pivotally connected to each of a series of crank arms 66 which are each in turn rigidly connected to one of the pivots of the troughs 57. It will be clearly apparent that the reciprocation of the cross piece 40 will serve first to raise the buckets 50, each full of liquid, from the tank and to empty these buckets into the duct 56 thus charging the buckets 57 and thereafter on the next down-stroke to operate bell crank 61 to rock the crank arms 66 and thus overturn the troughs discharging the contents of each bucket into an appropriate mold section while the buckets are going back for another charge. I consider this surfacing feed particularly important and broadly new. The liquid by means of the buckets 57 is first distributed evenly over the entire length of the mold section for which it is destined and then poured evenly into that mold section. The distribution of the liquid over the bottom of the mold section is always perfectly uniform although the liquid may be somewhat viscous and heavy. This construction will prevent any unevenness of the spread of the liquid such as might occur if it were poured into one end of the narrow mold section and allowed to find its way to the other end thereof.

The collar 39 has a bracket 67 attached thereto, to which is connected one end of the link 68 which at its other end is pivotally connected with the crank arm 69 upon the shaft 70, which carries the agitator for the enamel tank comprising the arms 71 upon which is mounted the perforated plate 72 (see Figs. 3 and 6). This agitator serves to keep the liquid thoroughly stirred.

The cushion feed.

(Figs. 1, 2, 4, 5, 6, and 7.)

I will now describe the cushion feed by means of which a cushioning layer is deposited into the molds on top of the liquid enamel in order to prevent the material from dropping directly into the enamel to remove excess moisture from the latter and to make up the thickness of the surfacing material, desired upon the brick. Mounted in the standards D and D' by means of the channeled arms 73 and 74 is the enamel hopper 75. This hopper preferably comprises an integral box having a flaring mouth, a constricted portion and an open flaring bottom. Mounted at the interior side angles of the hopper are the plates 76 and 77 see Fig. 6 which overlie a portion of the outwardly flaring bottom part of the hopper and extend the whole length of the sides thereof. The plates 76 and 77 overlie the upper ends of plates 78 and 79 which carry pins 80 and 81 projecting outwardly through slots 82 in the hopper, one pair of which is shown in Fig. 4. The pins 80 and 81 are connected by springs 83 and 84 with pins 85 and 86 in the sides of the hopper. The plates 78 and 79 are thus resiliently held in contact at all times with the sliding bottom of the hopper now to be described.

Integral with the bottom of the end of the hopper are upturned flanges 87 and 88 forming trackways which extend beyond the sides of the hopper. Running upon these trackways is a carriage construction comprising the large flat plate 89 which covers the whole bottom of the hopper and is provided with integral end extensions which are upturned, as shown at 90 and 91 in Fig. 4 and carry wheels 92 and 93 rolling upon the tracks 87 and 88. The plate 89 has a slot 94 therein, directly over which I mount, by means of short studs 95, having sharpened forward and rear edges, the knife 96. The plate 89 is pivotally connected by links 97 with arms 98 and 99 which are fastened to crank arms 100 and 101 upon shaft 102 which is provided at one end with a crank arm 103 in which is mounted the extension 104, pivotally connected to the rod 105, operated by a path cam 106 (see Figs. 1 and 2) mounted upon a shaft 149 journaled in the standards D F and F', and operated from the main drive in the manner to be described. The cam 106 operates the rod 107 loosely mounted on rod 107' mounted in the brackets 108 and 108' secured to the standards F and F', the lower end of the rod 107 being pivotally connected to the rearward end of the rod 105.

The operation of this part of the mechanism is as follows. As the molds come to rest under the cushion feed, the knife 96 is reciprocated lengthwise of the machine, thus planing off the required amount of material from the hopper 75, the material thus planed off dropping through the slot 94 and spreading itself evenly over the bottom of each mold section. The spring pressed plates 78 and 79 prevent the escape of material at the sides of the hopper 75 as the plate 89 is moved back and forth.

The material hopper.

(Figs. 1, 2, 6, 8 and 9.)

Mounted on brackets 109 and 110 projecting inwardly from the standards E and E' and supported thereby by means of channeled arms 111 and 112 is the material hopper 113. Rigidly mounted on the forward side of the material hopper is an arc shaped rack 114. The hopper 113 is constricted at its lower end which is left open. Mounted transversely across the open bottom of the material hopper are a series of shafts 115 each of which carries wings 116, the two end shafts 115 being provided with cylindrical extensions at one side. The construction is such that when the wings 116 are turned into a horizontal position, they close the bottom of the hopper and prevent the escape of material therefrom. Each of the shafts 115 between the two end shafts has rigidly connected therewith a crank arm 117 which is pivotally connected to the controller plate 118. This plate is supported by being pivotally connected at one end to the crank arm 119 and at the other end to the handle 120 the crank arm 119 and handle 120 operating the end closing members.

The handle 120 is provided with a spring latch 121 by which it may be set in any adjusted position with respect to the rack 114. It is obvious that by this construction according to the position of the handle 120 the wings 116 may all be set so as to leave just the same amount of opening between each adjacent pair of shafts 115 and that this opening may be adjusted with nicety to allow the feed therethrough of just as much material as is desired and no more. The space between adjacent shafts 115 overlies the mold compartments. Mounted transversely of the machine and having bearings in the material hopper 113 is a stirrer shaft 122 having stirring rods 123 thereon. This shaft is continuously rotated by means of the bevel gear 124 which it carries on one end and which engages with a bevel pinion 125 upon the shaft 126 which has a bearing in the channeled arm 112 and is supported at its upper end by a pivotal connection with a bracket 127 secured to the super-structure I (see Fig. 2). Upon the shaft 126 is a bevel pinion 127' which engages a bevel face pinion 128 secured to the large gear 193.

It is to be understood that the shaft 122 is continuously rotated and that the material in the hopper is therefore being continuously poured down between the wings 116. In order to prevent a waste of material by allowing it to drop between the molds upon the endless carrier, I provide each mold with an angle plate 129 extending the length of the mold and being designed to completely fill up the space between the adjacent sides of two consecutive molds as the molds are advanced in the machine. In order to prevent the waste of material dropped upon these plates 129 and also to flush the surfaces of the molds, I provide a stationary scraper blade 130 fastened to the material hopper 113 which scrapes over the tops of the molds and draws any excess material in the mold, together with the material which has been deposited upon the plates 129, into such molds as have space to receive the same.

*The compression plunger mechanism.*

About midway of the length of the frame castings A and A' and supported between standards E and E' is situated the compression plunger mechanism which compresses the material previously supplied by the hoppers to the mold sections into finished brick. This mechanism is disclosed in Figs. 10 and 12 of the drawings. To accommodate the great pressure of the plungers used to compress the brick, it is necessary to provide at this point an additional reinforcing member. For this purpose I provide the heavy channeled reinforcing structure 180 which is set into the frames A and A' as shown in Fig. 11, and has thereupon the raised platform 181 over and in contact with which the lower surface of the carriages 4 trail and which supports the carriages 4 during the operation of the compression plungers to be described. To accommodate the resultant forces in the opposite direction, I connect the standards E and E' at their top with the heavy channeled arch member 182. Bolts 183 pass through the members 180 and 182 and down vertical channels in the plates D and E, these bolts being provided at either end with nuts 184 whereby the entire structure is rendered firm and solid, and bound together at each of its corners to withstand the strain imposed by the toggles to be described. The standards E and E' are, in addition to being secured by the members 180 and 182, braced by cross connectors 186 as shown in Figs. 10 and 11.

Figure 2:
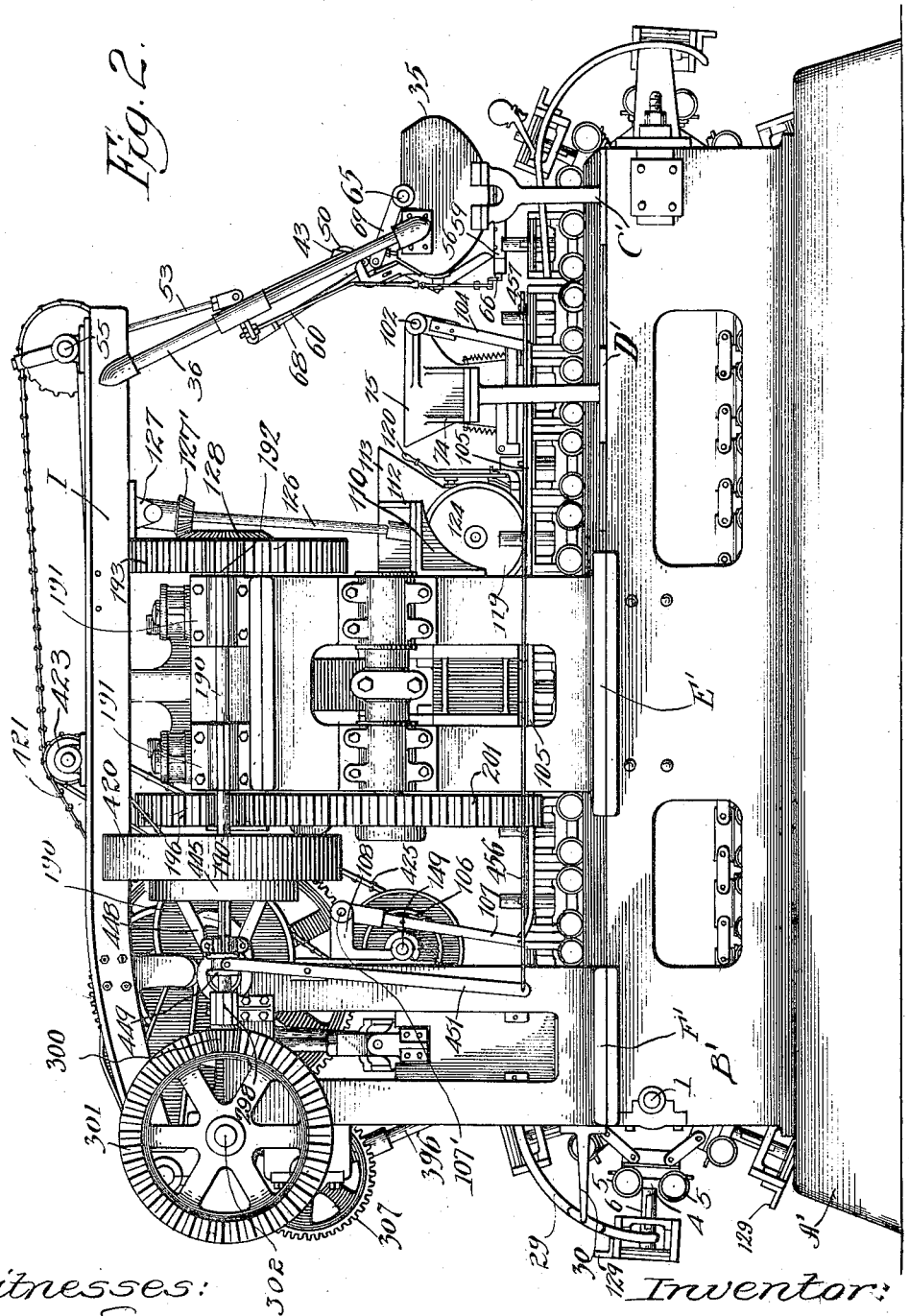
Fig. 2 is an elevation of the left hand side of the machine.

The main shaft 190 mounted in bearings 191 carried on the side frame G of the machine (see Fig. 2) carries a pinion 192 which meshes with the gear 193 (Fig. 10) on the shaft 194 mounted in the arch 182. The opposite end of shaft 194 carries a pinion 195 meshing with idler gear 196 on stub shaft 197. The idler gear 196 drives the large gear 200. The pinion 195 also meshes with the large gear 201 and cap plate 195ª is provided to keep the pinion 194 properly alined with the two gears 201 and 196. The gears 200 and 201 are mounted respectively upon shafts 205 and 206 having bearings in the standards E and E' as shown in Figs. 1 and 2. The shafts 205 and 206 are provided with cranked portions 207 and 208 revolubly connected with the pitmen 209 and 210. The pitmen 209 and 210 are each connected with a toggle. Only one of the toggles will be described inasmuch as both are similar.

The pitman 209 is flattened at its end and encircles the pin 215. The upper toggle arm 216 is formed at its ends to straddle the end of the pitman 209 and is apertured to form bearings for the pin 215. The lower toggle arm 218 is forked at its ends to straddle the ends 217 of the upper 216 toggle arm as shown in Fig. 12. The toggle which has just been described may be called in general T—1, the corresponding toggle connected to pitman 210 may be called T—2. The toggles T—1 and T—2 are pivotally connected at their upper ends with the blocks 220, 221 bolted to the arch 182 and at their lower ends with the sliding head 230 of the plunger mechanism. The head 230 is slidably mounted in guideways 231 and 232 bolted to the standards E and E' and carries at its lower face a plunger plate 233 having thereupon a series of individual plungers 234 adapted to take into individual mold sections to compress individual bricks upon the operation of the plunger as a whole. The plunger plate 233 has projecting therefrom at its ends, the pins 235 and 236. These pins extend farther than the plungers 234 and have conical lower ends adapted to fit into corresponding conical recesses in the molds whereby the molds are squared up with relation to the dies. By this means should the molds be slightly out of position they will be properly and accurately positioned before the plungers 234 can reach the plane of their upper surfaces and injury to the molds or machinery is thus prevented. The die-plate 233 above described is removably secured to the plunger head 230 by means of the channel bars 237 and 238 bolted to the plunger head 230 at either side thereof, as clearly shown in Fig. 11, while the faces 234 for the plunger plate 233 are dovetailed therein for removal and substitution as may be clearly seen from the drawings. From this construction, it is possible to remove any set of individual plungers and substitute another for coöperation with molds of another form without in any way dismantling the machine. The plunger mechanism just described operates to strongly compress the material in each mold compartment into the form of a finished brick. The heavy reinforced construction of the part of the machine and the construction of the toggles enables great pressure to be put on the brick.

The wiper mechanism.

(Figs. 11, 13, 14, and 15.)

It is desirable to clean the faces of the compression plunger after each operation thereof. For this purpose I provide the following mechanism. Rigidly depending from the rear cross piece 130 is a bracket 135 in which is adjustably mounted by a slot and bolt connection a plate 136 which has rigidly connected therewith the forwardly sloping arm 137, it being understood that these parts are duplicated upon the opposite side of the machine. The arm 136 also carries a roller 138 and pivotally mounted at the lower end of the arm 137 is a plate 139 to the other end of which is attached a spring 140 which is anchored to the frame at 142. The plate 139 carries a roller 141, the construction of these parts being such that the spring 140 constantly tends to rock the plate 139 upwardly and raise the roller 141. Interposed between the rollers 138 and 141 are the side members 143 of a U-shaped frame, the front of which consists of a scraper blade 144. The forward end of the arms 143 of this U-shaped frame are provided with a raised portion 145 behind which is a sloping portion 146. The rear ends of the arms 143 are pivoted to levers 147 which in turn are loosely mounted on the rod 107 hereinbefore described, carried in the brackets 108, 108' on the frame. Path cams 148 rigidly mounted on shaft 149 serve to reciprocate the side piece 143 in an obvious manner. The construction is such that the forward ends 145 of the side pieces 143 are always engaged between the two rollers 141 and 138. As the rod 143 moves forward the inclined portion 146 of the member 143 strikes the rollers 138 and the frame is allowed to rise under the impulse of springs 140. This action takes place just as the scrapers 144 come under the noses of the plungers. The scrapers are then pushed forward and retracted all the while being held in contact with the noses of the plunger by the spring 140, moving down again at the end of their rearward stroke as the inclined portion 146 again engages the roller 138. This action serves to clean the plungers after each working stroke.

The releasing plungers.

(Figs. 18 to 26.)

After leaving the compression plungers, the molds are advanced to a position between the standards F and F' wherein are mounted the releasing plungers and other mechanisms. The main shaft 190 of the machine revolves in bearings 191 (Fig. 2) and 298 (secured to the standard F') and carries at its rearward end the bevel pinion 300 (Figs. 2 and 20) meshing with the bevel gear 301 and mounted on the shaft 302 revolving in bearings in the standards F and F'. The shaft 302 carries on its opposite end a pinion 303 shielded by a cover plate 304 which pinion meshes with the large gear 305 on shaft 306 carried in bearings in the two standards F and F'. The pinion 303 also meshes with a gear 307 upon the shaft 308 also carried in bearings on the standards F and F'. The shaft 308 carries a crank and pitman for a purpose hereinafter to be described. The shaft 306 has mounted thereon the path cams 310 and 311 (see Figs. 20 and 21) with which coöperate the cam followers 312 and 313 pivotally mounted upon the shaft 315 carried by the standards F and F' by means of the split bearings 316 and 317, (Fig. 18). The shaft 306 has also mounted thereupon the path cams 320 and 321, with which coöperate the cam followers 322 and 323 mounted upon the shaft 315. Between the path cams 320 and 321 is a sprocket 325 for a purpose hereinafter to be described. The cams 310 and 311 and the associated cam followers operate lifter mechanisms hereinafter to be described. The cams 320 and 321 operate the releasing plungers. From the cam followers 322 and 323 depend the pitman 330 and 331 which operate the plunger head 332 carrying the releasing plungers 333. The releasing plunger head and associated mechanisms are mounted in supporting structure carried by the standards F and F'. The supporting structure on the left side of the machine will be specifically described, it being understood that that on the right is precisely the same throughout. The standard F' Fig. 25 is provided with a plurality of lugs 335 outstanding from the vertical webs 336 bounding its center apertures. Firmly bolted to the standard by means of these lugs is the upright frame 340 carrying the extension 342 upon which is mounted the rearward end of the track or guideway 29. Overlapped upon the upright frame 340 and secured thereto by means of bolts 343 passing through angled extensions 344 is the slide frame 345. Adjacent the angled extensions 344 are a plurality of slots 382 in the member 345 through which pass bolts 347 screwed into the frame 340. By this slot and bolt connection 346 and 347 just described and by means of the bolts 343, the slide frame 345 may be adjusted back and forth in the machine. Opposite the slide frame 340 is a slide frame 341 in all respects similar thereto. The slide frames 345 and 346 are each provided with a slide-way for the plunger head 332 above described. Projecting into this slide-way from the members 345 and 346 respectively are lugs 350 and 351. The plunger head 332 is of somewhat peculiar construction. It involves a plate 352 from which project downwardly the plungers 333 upon the ends of which are removably mounted the plunger dies 333'. Plate 352 carries upon its upper side bearings 353 and 354 for the pitmen 330 and 331 by which it is caused to reciprocate. Rising from the opposite sides of the plate 352 are the side walls 355 and 356 braced intermedially by the web 357. The plate 352 is recessed to escape lugs 350 and 351 as the plunger reciprocates, and carries on its lower face the pins 360 and 361 having a turned down portion projecting through the plate and secured by nuts 362 and 363. The pins 360 and 361 have conical lower ends and serve to accurately position the lower releasing plunger, precisely as similar pins 235 and 236 perform the same function in connection with the compression plungers. The side plates 355 and 356 of the plunger head 332 have upstanding projections at their ends and these projections are connected at each end by the arches 364 and 365 removably bolted thereto as shown in dotted lines in Fig. 25 and in section in Fig. 19. By this construction the arches 364 and 365 may be removed and the releasing plunger head removed without dismantling the machine. Contact bolts 366 and 367 are carried by the arches 364 and 365 in a position to contact at their lower ends with the lugs 350 and 351. By setting the bolts 366 and 367 the lower limit of the vertical movement of the plunger head 332 can be controlled in order to bring these plungers accurately to use upon the tops of the bricks. It is the function of the releasing plunger mechanism to hold the finished brick down upon the mold platen while the sides of the mold are being lifted up away from the platen.

The lifter mechanism.

I will now describe the lifter mechanism. Depending from the cam followers 312 and 313, heretofore described, are the pitmen 370 and 371 pivotally connected to the forked upper ends of the lifter blades 372 and 373. The lifter blades 372 and 373 are slidably mounted in slide-ways 374 and 375 in the frames 340 and 341, and held therein by the members 345 and 346, the inner corners 376 of which overlap the edges of the slide-ways as clearly seen in Fig. 25. The bottom part of the lifter blades 372 and 373 are widened and inturned as at 378 and 379, see Figs. 19 and 22. The upright frames 340 and 341 at either side of the machine are provided near their lower ends with a pair of lugs 380 and 381. Slidably mounted in these lugs and in alinement with orifices in the forward ends of the members 340 and 341 are a plurality of similar rods 382 (Figs. 19 and 26), these rods having turned down portions 383 carrying the nuts 384 and jam nuts 385 at their outer ends to limit their inward movement. Upon the turned down portions 383 of the rods 382 and inside the lugs 380 (or 381) are mounted compression springs 386 which serve to resiliently force the rods 382 toward the center of the machine. Each pair of these rods 382 carries a beveled track bar 387 in a horizontal position, and having an inclined lower edge at its forward portion as shown in Fig. 19.

In operation the lifter blades 372 and 373 are in a lowered position when the molds advance to a position under the plungers 333, (Fig. 19). Thereafter the plungers 333 descend to hold the bricks firmly upon the platens and the lifter blades are raised, their lower inturned edges 378 and 379 engaging with the lower projections 19 of the molds to raise the latter. As the molds are raised by the lifter blades 372 and 373, the inclined outer faces of the upper end projections 18 of the molds slide past the inclined inner edges of the track bars 387, the rods 382 giving backward against springs 386 until the upper projection of the ends of the molds has passed the bars 387 when the rods 382 spring forward and tape underneath the projection 18 as clearly shown in dotted lines in Fig. 19. Angle bars 390 and 391 are provided to limit the upward movement of the molds, as clearly shown in Fig. 19. The bars 387 are in horizontal alinement and form a continuation of the inner ends of the tracks 29. After the molds have been lifted from their lowered position to their upper position, the advance of the mold carriages causes them to pass off track bars 387 onto the fixed trackway 29 and so around under the machine. By this means the molds are held up away from the pallet bed plate as the brick emerges from the machines, which permits the pallet bed plates and the bricks thereon to be removed as units.

*The carriage advancing mechanism.*

The gear 307 above described carries thereon a crank 395 which through the intermediary of the link 396 periodically rocks the plate 397 pivoted upon the conveyer shaft 1 see Fig. 1. The plate 397 has a pawl 398 thereupon which engages with a ratchet 399 fast upon the conveyer shaft 1. The pawl 398 has rigid therewith a twin arm 400 carrying thereon a pin 401. Upon the outer end of the shaft is loosely mounted a bell crank 402, the inner arm of which is connected by the link 403 with the crank 404 carried on the cap 405 secured upon the end of the shaft 306. The other end of the bell crank 402 is formed into the cam 406. The function of this mechanism is to periodically raise the pawl 398 away from the ratchet 401 and thus cause a pause in the advance of the conveyer while the plungers are operating.

*The driving connections.*

The main driving shaft of the machine 190 is driven from the belt pulley 420 from any suitable source of power. The shaft 190 drives the cam shaft 306 through pinion 300, gear 301, shaft 302, pinion 303, gear 305, as hereinabove described. The sprocket 325 upon the cam shaft 306 is connected by the chain 421 with a triple sprocket 422 upon the shaft 423 carried in suitable bearings mounted on the superstructure I hereinabove described, (Fig. 1).

One sprocket of those forming the triple sprocket 422 is connected in turn with a sprocket 424 on the shaft 55 supported in suitable bearings at the front end of the machine on the super-structure I, see Figs. 1 and 2 hereinbefore described. Another sprocket of the triple sprocket 422 is connected to shaft 149 by chain 425 and sprocket 426.

*The stop mechanism.*

I have chosen herein a toggle friction clutch comprising the flanged wheel 445 into driving contact with which may be forced the friction blocks 446 operated by toggles 447 through links 448 controlled from the sliding collar 449 operated by pivoted lever 450 in an obvious manner. The lever 450 is connected at its lower end with a link 456. The link 456 is connected with a horizontal lever 457 pivoted at 458 upon an auxiliary stand 459, adjacent the front of the machine. In the lever 457 is mounted a set screw 460, the vertical height of whose lower end may be adjusted at will and in practice is so adjusted as to just escape contacting with the tops of the end extensions of the molds, which are properly seated upon their pallets. If any mold is being fed to the machine in which the pallet and molds are not properly engaged so that the mold sections do not fit into and about the raised portion 13 of pallets 12, see Fig. 30, the top and extensions of the mold will be displaced upwardly and in this condition will contact with the set screw 460 to throw the clutch and stop the machine.

*The operation.*

The operation of the machine as a whole is as follows: The chain conveyer is intermittently advanced to bring it in successively under the various devices involved in the machine. Beginning at the right hand side of Fig. 1 it will be apparent that as the molds are advanced off the end of the guide 29 and go back upside down to the front end of the machine, the mold sections 15 will drop down on the pins 6 until the plates 20', Fig. 19, engage the material forming the top of the cut away portions of the said pins. As the conveyer is moved around at the front end of the machine, the guides 27 will enter the recesses 20 in the ends of the mold sections and maintain the mold sections at a distance away from the pallet bed plate during the time the mold is righting itself in the travel of the conveyer. This is for the purpose of allowing the operator to accurately position the platen 12 upon the pallet bed plate. The guides 27 gradually approach the conveyer at their rearward ends and by the time the mold has reached the spouts 42, the mold sections 15 are accurately and firmly seated upon the pallet bed plates to make complete mold bottoms. At this point the dipper mechanism operates to pour a predetermined quantity of the enameling mixture from a tank 35 into each molding compartment. The quantity placed in each mold box is precisely the same as that put in every other mold box and may be varied by adjusting trips 52. (See Fig. 6.)

The molds with their complement or enameling material then progress to a position underneath the cushion feed. The cushion feed is operated as heretofore described to deposit a predetermined and exact quantity of cushioning material in each mold box. Having now received their cushioning layer, the molds advance to a position underneath the material hopper 113 where they are charged with the material for forming the body of the brick. The molds next go under the compression plungers 234. Here if the mold carriage has become slightly distorted the centering pins 235 and 236 which engage the mold sections before the plungers 234 come in contact with the material, properly position the mold sections. Prior to going under the compression plungers, each mold is leveled if it is heaped and plates 129 cleaned by the scraper 130. This portion of the machine is constructed of very heavy material and heavily reinforced. The compression plungers 234 exert great pressure upon the material in the mold boxes compressing it into the form of finished brick. After each operation the noses of the plungers are wiped.

The mold next advances to a position under the releasing plungers 333, passing over the lower inturned ends of the lifter blades. In this position the releasing plungers come down into contact with the tops of the brick in the mold boxes and firmly hold these bricks down upon the pallet while the lifter blades raise the mold boxes until the spring plates or tracks 385 have snapped under the lower edge of projections 18 on the mold sections. The spring tracks 385 are in horizontal line with the guide members 29. The molds are then moved out from the rear of the machine, the mold sections 15 being held in an elevated position away from the pallets whereby it is possible for an operator to remove the pallets, together with the brick thereupon and set the same away to dry. By this arrangement the bricks are each left undisturbed upon the pallets until dry and the finished surface is not marred by any relative movement between the two while the brick is wet.

I have described the course of one mold about the machine. It is obvious that the molds advance in succession through the process just described, one after the other and that while the operation is going on in one the succeeding operation is going on upon a mold in the front of it. The conveyer is operated by the mechanism disclosed from which it will be seen that there is a dwell in operation corresponding to the time consumed by the operation of the plungers 234 and 333, the conveyer advances two steps to bring the next succeeding mold under any part of the mechanism.

While I have stated the general operation and objects of this invention and described it as particularly applied to the formation of enameled brick having a smooth face, I wish it to be clearly understood that it is entirely possible and practicable by my machine to make rough surfaced brick, such as are coming into very general application. This brick can be made in my machine, simply by feeding coarser material to the mold first, the liquid layer next, then the body material. This method can be varied by varying the material fed at each stage to form any kind of composite brick, which has as yet been designed.

It is, of course, obvious that different colors may be used for the various layers of material going into the brick and that these colors may be mixed or mingled in any way to produce any coloring desired in the finished brick.

It is also obvious that if desired, the liquid layer could be made of enamel of any known variety. By my preferred method, however, I obtain all the advantages of an enamel coated brick while yet producing a brick of the same composition (save for the coloring matter) throughout and far cheaper to manufacture than a brick having an enamel coating.

If it is desired to make brick having a finished face and side, this can be done according to my invention, simply by providing the platen bed plates with one upstanding side arising from the raised portion forming the bottom section of each mold compartment.

I claim:—

1. In apparatus of the class described, a mold having pallets, means for depositing a finely comminuted surfacing material in a fluid state into said mold and into contact with said pallet, means to discharge a cushioning layer for even distribution over said fluid layer, means to thereafter fill said mold with brick material, means to thereafter compress all of said charges into the form of finished brick together with means to permit the removal of said pallet and the brick thereupon without disturbing the contact between the two whereby said brick will dry in contact with said pallet.

2. In a machine for making enameled brick, a conveyer, a plurality of mold carriages upon the conveyer, a plurality of mold sections permanently connected to said mold carriages, a plurality of compartments in each mold section, means to cause the travel of the conveyer, means to measure out a predetermined quantity of fluid material, into each mold compartment, means to discharge a predetermined quantity of powdered or like material into each mold compartment, means to thereafter charge each mold with material for making the body of the brick, means to compress the material in the mold compartments into finished brick and means to permit removal of said brick from the machine without disturbing the contact of the brick with the bottoms of the molds.

3. In apparatus of the class described, a conveyer, a plurality of mold carriages upon the conveyer, mold sections having a limited movement with respect to said mold carriages, pallets adapted to be introduced between the mold carriages and the mold sections, and to form the bottoms of the mold sections, said pallets having polished non-adhesive surfaces, means for evenly spreading out a fluid in intimate contact with the polished non-adhesive surfaces of the pallets, means to thereafter discharge cushioning material into said mold sections to absorb excess moisture from the fluid and to protect the latter from the impact of subsequent charges, means to thereafter strongly compress said charges, means to thereafter move said mold sections away from the mold carriages and other means to at the same time hold the finished brick in contact with the pallets upon said mold carriages so that the contact between the brick and the pallets remains unbroken whereby the pallets and the brick thereon may be removed from the machine without disturbing the contact between the polished non-adhesive surface of the pallets and the finished brick.

4. In apparatus of the class described, a mold having a polished non-adhesive surface, means for depositing a finely comminuted surfacing material in a fluid state into said mold and into contact with said polished surface, means to discharge a cushioning layer for even distribution over said fluid layer, means to thereafter fill said mold with brick material, means to thereafter compress all of said charges into the form of finished brick together with means to permit the removal of said polished mold surface and the brick thereupon without disturbing the contact between the two whereby said brick when dried in contact with said polished surface will assume the polish thereof.

5. In a device of the class described, a conveyer, a series of mold sections mounted thereon having molds therein, a series of pallets each having a polished non-adhesive surface removably mounted on the conveyer and forming a surface of the molds, means for feeding a liquid or semi-liquid surfacing layer to said molds, means for feeding a cushioning layer to said molds on top of said surfacing layer, means for thereafter charging said molds with material to form the body of the brick, means for thereafter compressing all of said charges into the form of a finished brick, means for automatically releasing the pallets and the articles formed on them without breaking the contact between them to allow the pallets to be set away with the articles upon them so that the articles may dry and harden and a polished surface be imparted to it similar to that upon the pallet.

6. In apparatus of the class described, a conveyer, a tank adapted to contain a fluid, mold carriages on said conveyer including multiple part molds having removable bottoms with polished non-adhesive surfaces, troughs adapted to overlie and substantially cover subjacent mold compartments, means to convey a predetermined charge of fluid from said tank to each of said troughs, means to periodically empty said troughs into said mold compartments, whereby the fluid is discharged simultaneously into substantially the whole extent of the mold bottom and spreads itself evenly thereover forming an even layer in intimate contact with the polished surface of said mold bottom.

7. In an apparatus of the class described, a frame, a conveyer adapted to carry molds through the frame, means to supply material for making brick to the molds, compression mechanism mounted on the frame and comprising a plunger head, a pair of toggles for reciprocating said plunger head, dies on the plunger head to take into the molds and means for squaring up the molds prior to the insertion of the dies therein.

8. In apparatus of the class described, a plunger head comprising a plunger plate, a die plate having dies thereon, angle bars extending beneath the edges of said die plate and removably bolted to the sides of said plunger plate whereby the die plate may be removed by loosening said angle bars without disturbing the plunger head.

9. In apparatus of the class described, a die plate comprising a plurality of dies, a pair of pins projecting from said die plate at either end thereof, said pins having conical ends for the purpose specified.

10. In apparatus of the class described, a plunger head provided with a transverse raised portion, a die plate provided with a recess corresponding to said raised portion, angle bars removably secured to said plunger head and extending beneath the die plate whereby the latter is removably secured to the plunger head.

11. In apparatus of the class described, a mold, a die, a pivoted link, means to cause said die to compress material in said mold and means to wipe the surface of said die after each compression, said means being carried on said pivoted link.

12. In apparatus of the class described, a conveyer, a series of molds upon the conveyer, means to successively advance the conveyer and the molds, means for discharging brick making material into molds, compression mechanism comprising compression plungers and means comprising a blade for cleaning the faces of the compression plunger after each operation thereof.

13. In apparatus of the class described, a conveyer, mold carriages upon the conveyer, means to cause the movement of the conveyer through the apparatus, mold sections upon the mold carriages and having a movement relative thereto, pallets and pallet bed plates, means upon said pallet bed plates for the reception of said pallets, means to cause the mold sections to move toward the pallet bed plates and to thereby form with said pallets upon the pallet bed plates complete molds adjacent the front of the machine, means to stop the machine if the mold sections and pallets are not in correct relative position as they move past a given point.

14. In apparatus of the class described, an endless conveyer, a plurality of mold carriages on said conveyer comprising pallet bed plates adapted to receive pallets and a pallet thereon, a plurality of mold sections having limited movement relative to said pallet bed plates, means to cause movement of said conveyer whereby said mold carriages are successively moved under brick forming portions of the machine, together with means to stop the machine, said last mentioned means being operated by the passage of an improperly assembled mold and pallet past a given point therein.

15. In apparatus of the class described, compression plungers, a conveyer, mold carriages on the conveyer, molds upon said carriage, pallets for said molds, means associated with the compression plungers for squaring up the mold carriages before the entry of the plungers thereinto, means to stop the machine upon improper positioning of the molds and pallets upon the mold carriages, said last mentioned means being operated by the passage of an improperly assembled mold past a given point.

16. An apparatus of the class described, a conveyer, a pallet bed plate on the conveyer adapted to receive a pallet, mold sections movable relative to the pallet bed plate and adapted to register with the pallet, driving mechanism for the machine including a clutch, means to throw out said clutch and stop the machine after improper registry of the mold sections with the pallet.

17. In a machine of the class described, a series of multiple part molds, a pallet for each mold, means to advance the molds and pallets under brick making machinery, and said machinery, and a stop motion operative upon improper assemblage of the molds and pallets and actuated by the passage of an improperly assembled mold and pallet past a given point.

18. In a machine of the class described, an endless conveyer having a plurality of mold carriages thereon, said mold carriages comprising pallet bed plates adapted to receive pallets, and a pallet thereon, a plurality of mold sections having limited movement relative to said pallet bed plates, means for causing movement of said conveyer to successively bring said mold sections under brick pressing dies, and a movable stop mounted adjacent said conveyer and operatively connected with the conveyer driving means whereby a mold section improperly assembled upon said pallet will in moving with said conveyer strike said stop and throw the conveyer driving means into inoperative position.

19. In a machine of the class described a frame, an endless conveyer, a compression mechanism comprising compression dies, a plurality of molds on said conveyer and adapted to be successively presented beneath said dies, means to depress and elevate said dies, a longitudinally movable arm mounted in said frame, a scraping blade on said arm, and means to cause said blade to move upwardly into contact with the lower face of said dies upon forward movement of said arm, and to be lowered away therefrom when said arm is retracted, whereby to clean said die faces.

20. In a machine of the class described, a longitudinally movable conveyer, a mold carriage thereon, a pallet on said carriage, a mold section on said pallet, means for moving said conveyer longitudinally to bring said mold section under brick pressing dies, and a stop operatively connected with said conveyer moving means to control the same and positioned slightly above the normal path of said mold section whereby a mold section improperly positioned on said pallet will in moving with said conveyer strike said stop and bring said conveyer to a standstill.

In witness whereof, I hereunto subscribe my name to this specification in the presence of two witnesses.

FRANK R. STEHM.

Witnesses:
GEORGE MANKLE,
M. E. MARTIN.